(12) United States Patent
Mitsue et al.

(10) Patent No.: US 10,974,290 B2
(45) Date of Patent: Apr. 13, 2021

(54) FOREIGN OBJECT INSPECTION DEVICE AND FOREIGN OBJECT INSPECTION METHOD

(71) Applicant: SUGINO MACHINE LIMITED, Uozu (JP)

(72) Inventors: Toyoaki Mitsue, Uozu (JP); Tomio Sawasaki, Uozu (JP); Chieko Kanayama, Uozu (JP)

(73) Assignee: SUGINO MACHINE LIMITED, Toyama Prefecture (JP)

( * ) Notice: Subject to any disclaimer, the term of this patent is extended or adjusted under 35 U.S.C. 154(b) by 393 days.

(21) Appl. No.: 16/037,251

(22) Filed: Jul. 17, 2018

(65) Prior Publication Data
US 2019/0084013 A1    Mar. 21, 2019

(30) Foreign Application Priority Data

Sep. 19, 2017  (JP) .............................. JP2017-178570

(51) Int. Cl.
*G01N 15/10*    (2006.01)
*G01N 15/02*    (2006.01)
(Continued)

(52) U.S. Cl.
CPC ................. *B08B 5/02* (2013.01); *B08B 5/04* (2013.01); *B08B 9/021* (2013.01); *G01N 1/02* (2013.01);
(Continued)

(58) Field of Classification Search
CPC ............... G01N 15/02; G01N 15/0205; G01N 15/0211; G01N 15/0227; G01N 15/10; G01N 15/1463; G01N 2015/0216; G01N 2015/0222; G01N 2015/025; G01N 2015/0294; G01N 2015/1087;
(Continued)

(56) References Cited

U.S. PATENT DOCUMENTS 6,408,701 B1     6/2002  Fujita
2007/0263920 A1  11/2007  Fujii et al.
(Continued)

FOREIGN PATENT DOCUMENTS

DE  102016203666 A1   4/2016
DE  102015106777 A1  11/2016
(Continued)

OTHER PUBLICATIONS

Extended European Search Report dated Feb. 13, 2019 mailed in the corresponding European patent application No. 18185400.1, 12 pp.

*Primary Examiner* — Herbert K Roberts
(74) *Attorney, Agent, or Firm* — United IP Counselors, LLC

(57) ABSTRACT

A foreign object inspection device determines the position and the shape of foreign objects remaining on a workpiece. The foreign object inspection device for inspecting foreign objects at inspection spots of a workpiece includes a nozzle including a suction port that sucks a foreign object, an exhauster, and a suction channel connecting the nozzle to the exhauster, and a detector installed on the suction channel to detect foreign object information about the shape of the foreign object sucked through the suction port.

15 Claims, 17 Drawing Sheets

(51) Int. Cl.
*G06T 7/00* (2017.01)
*G06T 7/62* (2017.01)
*G06K 9/46* (2006.01)
*B08B 5/02* (2006.01)
*B08B 5/04* (2006.01)
*G01N 15/14* (2006.01)
*G01N 1/02* (2006.01)
*B08B 9/02* (2006.01)
*G01N 15/00* (2006.01)
*G01N 21/94* (2006.01)

(52) U.S. Cl.
CPC ....... *G01N 15/147* (2013.01); *G01N 15/1459* (2013.01); *G01N 15/1468* (2013.01); *G06K 9/4609* (2013.01); *G06T 7/001* (2013.01); *G06T 7/62* (2017.01); *B08B 2215/003* (2013.01); *G01N 21/94* (2013.01); *G01N 2001/028* (2013.01); *G01N 2015/0046* (2013.01); *G01N 2015/1486* (2013.01); *G01N 2015/1497* (2013.01); *G06T 2207/30164* (2013.01)

(58) Field of Classification Search
CPC ... G01N 2015/1093; G01N 2015/1465; G01N 2015/1493; G01N 2015/1497
See application file for complete search history.

(56) References Cited

U.S. PATENT DOCUMENTS

| | | | |
|---|---|---|---|
| 2014/0096624 A1* | 4/2014 | ElNaggar | G01N 1/14 73/864.34 |
| 2014/0238684 A1 | 8/2014 | Caneer | |
| 2017/0242234 A1* | 8/2017 | Ashcroft | G02B 21/24 |
| 2018/0275097 A1* | 9/2018 | Sandoghdar | G01N 21/53 |

FOREIGN PATENT DOCUMENTS

| | | | | |
|---|---|---|---|---|
| EP | 0029980 A2 * | 6/1981 | ......... | B23Q 11/006 |
| EP | 0029980 A2 | 6/1981 | | |
| EP | 2862638 A1 | 4/2015 | | |
| JP | 2011-179987 A | 9/2011 | | |

* cited by examiner

FOREIGN OBJECT INSPECTION DEVICE AND FOREIGN OBJECT INSPECTION METHOD

CROSS-REFERENCE TO RELATED APPLICATIONS

This application claims the benefit of priority to Japanese Patent Application No. 2017-178570, filed on Sep. 19, 2017, the entire contents of which are hereby incorporated by reference.

BACKGROUND

1. Technical Field

The present invention relates to a foreign object inspection device and a foreign object inspection method for inspecting foreign objects remaining on a workpiece.

2. Description of the Background

A known inspection method includes cleaning an inspection target (workpiece) such as a machine component with a cleaning liquid, filtering the liquid used, and observing the residues captured on the filter. A residue measuring apparatus then images the residues on the filter, and subjects the obtained data to image processing (refer to, for example, Japanese Patent Application Publication No. 2011-179987, or Patent Literature 1).

BRIEF SUMMARY

The technique described in Patent Literature 1 is not intended to detect the position and the shape of foreign objects remaining on a workpiece.

One or more aspects of the present invention are directed to a foreign object inspection device and a foreign object inspection method that determine the position and the shape of foreign objects remaining on a workpiece.

A first aspect of the present invention provides a foreign object inspection device for inspecting foreign objects at inspection spots of a workpiece, the device comprising:
a nozzle including a suction port configured to suck a foreign object;
an exhauster;
a suction channel connecting the nozzle to the exhauster; and
a detector installed on the suction channel, the detector being configured to detect foreign object information about a shape of the foreign object sucked through the suction port.

A second aspect of the present invention provides a method for inspecting a foreign object on a workpiece, comprising:
placing a suction port in contact with an inspection spot of a workpiece;
sucking a foreign object through the suction port;
detecting foreign object information about a shape of the foreign object; and
storing the foreign object information in a manner associated with the inspection spot.

The foreign object inspection device and the foreign object inspection method according to the above aspects of the present invention determine the position and the shape of foreign objects remaining on a workpiece.

DETAILED DESCRIPTION

First Embodiment

Figure 1:
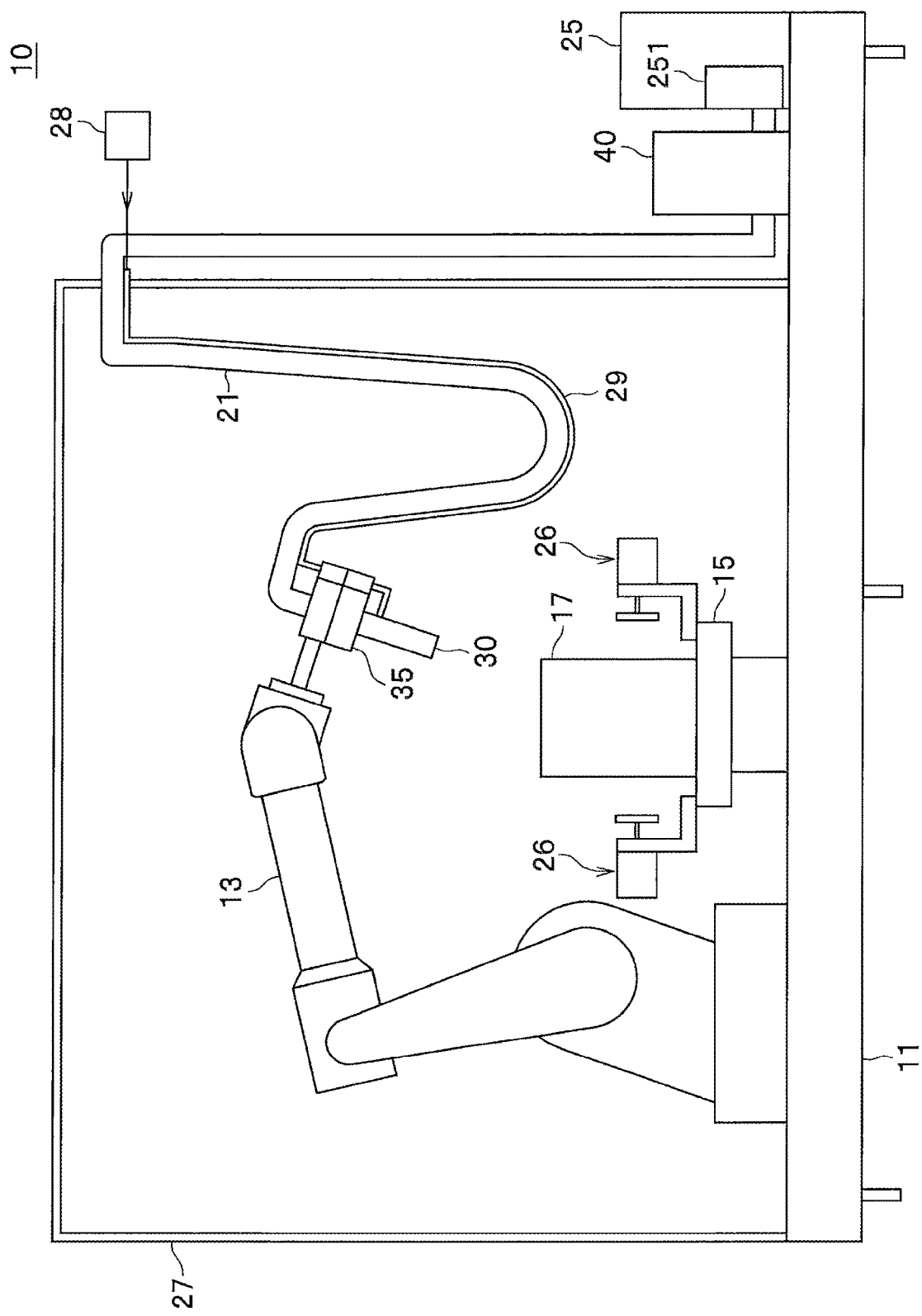
FIG. 1 is a schematic diagram of a foreign object inspection device showing its overall structure according to a first embodiment.

A foreign object inspection device (hereafter simply an inspection device) 10 according to a first embodiment will now be described. The inspection device 10 inspects a foreign object as an inspection target remaining on a workpiece 17. As shown in FIG. 1, the inspection device 10 includes a base 11, an arm 13, a mount 15, a nozzle 30, a suction duct (suction channel) 21, a detector 40, an exhauster 25, and a safety fence 27. The inspection device 10 may also include sealing devices 26.

The base 11 is a frame. The base 11 may include a drain pan on its lower surface.

The arm 13 is located on the upper surface of the base 11. The arm 13 is a robot, such as a vertically articulated robot, an orthogonal robot, or a parallel link robot. The nozzle 30 is located at the distal end of the arm 13. The arm 13 moves the nozzle 30 to be in contact with inspection spots 18 (collectively for inspection spots 181 to 185 in FIG. 7) of the workpiece (inspection target) 17.

The mount 15 is located on the upper surface of the base 11. The mount 15 receives the workpiece 17.

The safety fence 27 covers the base 11. The safety fence 27 has a door (not shown) for an inspector to enter.

The suction duct (suction channel) 21 connects the nozzle 30 to the detector 40. The suction duct 21 is suspended between the nozzle 30 and a position near the ceiling of the safety fence 27. The suction duct 21 is, for example, a flexible duct hose. The suction duct 21 may be contained in a cable protection pipe. The suction duct 21 may be formed from a conductive material and grounded. A heater may be arranged around the outer peripheral surface of the suction duct 21.

The grounded conductive suction duct 21 prevents a foreign object 51 (refer to FIGS. 8A and 8B) passing through and sliding along the suction duct 21 from being electrically charged and adhering to the suction duct 21. An external heater heats the suction duct 21 to prevent water contained in sucked air from condensing and adhering to the inner surface of the suction duct 21.

The foreign object 51 refers to any substance adhering to and remaining on the workpiece 17, such as chips or lint.

The suction duct 21 may extend along the arm 13 instead of being suspended from near the ceiling.

The exhauster 25 is a vacuum pump, such as a dry rotary vane vacuum pump, a dry scroll vacuum pump, or an oil rotary vacuum pump. The exhauster 25 may include an exhaust valve 251. When the exhauster 25 is activated and the exhaust valve 251 is open, the exhauster 25 starts sucking the foreign object 51 or other substances through the suction port along the suction duct 21. The exhaust valve 251 eliminates repeated activation and deactivation of the exhauster 25 and thus shortens the cleaning time.

The nozzle 30 will now be described with reference to FIG. 2. The nozzle 30 includes a support rod 39, a suction pipe 38, and a suction port 33. The support rod 39 includes a flange 391. The flange 391 is fixed to a mount surface 131 of the arm 13. The support rod 39 supports the suction pipe 38.

The nozzle 30 may include a suction nose 32, which is located at the distal end of the suction pipe 38. The suction nose 32 has a suction port 33 at its distal end. The suction nose 32 holds the suction port 33, which is retractable along the axis of the suction pipe 38. FIG. 2 shows the suction nose 32 being contracted in the right half, and being extended in the left half.

The suction pipe 38 is hollow and cylindrical. The suction pipe 38 has a suction channel connection port 37 at its basal end. The suction duct 21 is connected to the suction channel connection port 37.

The suction port 33 is circular, rectangular, or specifically shaped in conformance to the shape of the inspection spot 18. The suction port 33 is slightly larger than the inspection spot 18. For the inspection spot 18 including an internal thread of the nominal size of M6, for example, the suction port 33 is circular and has an inner diameter (or a diameter) of 7 to 9 mm. The material defining the suction port 33 is selectable from materials soft enough not to damage the workpiece 17 when the suction port 33 touches the workpiece 17. For an aluminum workpiece 17, the material defining the suction port 33 is selectable from conductive plastic and conductive rubber.

The suction pipe 38 may include a ring 314 and slide surfaces 311 and 312. The suction pipe 38 includes a ring 314 located at a basal end of the suction pipe spring guide 315 and holding an end of the helical spring 325. The suction pipe 38 includes cylindrical slide surfaces 311 and 312 on the inner peripheral surface of its distal end. The slide surface 312 has a smaller diameter than the slide surface 311, and is located nearer the distal end than the slide surface 311. The slide surface 311 and the slide surface 312 together define a step 313, which functions as a stopper for a guide tube 322.

The suction nose 32 includes a guide tube 322, a slide guide 323, a spring guide 324, and an elastic helical spring 325. The guide tube 322 is hollow and cylindrical, and has its outer peripheral surface slidable on the slide surface 312. The slide guide 323 is located at the basal end of the guide tube 322. The suction port 33 is located at the distal end of the guide tube 322. The slide guide 323 has a larger diameter than the guide tube 322. The spring guide 324 is located on the outer surface of the guide tube 322 at its distal end. The spring guide 324 has an outer diameter slightly smaller than the inner diameter of the helical spring 325. The helical spring 325 is supported by the spring guide 324 and the outer surface of the suction pipe 38 at its lower end, and held between the ring 314 and the suction port 33. The helical spring 325 urges the suction nose 32 toward the distal end. The suction nose 32 slides in the suction pipe 38 while the slide guide 323 slides along the slide surface 311 and the guide tube 322 slides along the slide surface 312. The helical spring 325 may be replaced by another elastic member, such as a disc spring, a leaf spring, or a rubber tube.

The inspection device 10 further includes a lance 34, a compressed air feeder 28, and an air tube (compressed air feeder tube) 29.

The lance 34 is installed in the nozzle 30. The lance 34 is inserted from outside the suction pipe 38 into the suction pipe 38. A distal end of the lance 34 extends in the direction in which the suction port 33 is retractable, or in other words concentrically with the suction pipe 38. When the suction nose 32 is extended, the distal end of the lance 34 is adjacent to the suction port 33. The distal end of the lance 34 is closed. The lance 34 has one or more orifices 341 in the peripheral surface of the distal end. The lance 34 may have multiple orifices 341 radially at circumferentially equal intervals in the peripheral surface of the distal end. The lance 34 may have multiple orifices 341 in its axial direction. For example, the lance 34 may have eight orifices 341, or four arranged in the circumferential direction and two arranged in the axial direction as shown in the figures.

When each inspection spot 18 as a main inspection target is a flat surface, the lance 34 may have orifices 341 at its distal end in place of the orifices 341 arranged in the circumferential direction. In this case, the distal end of the lance 34 is located slightly inward from the suction port 33 without protruding outward from the suction port 33 when the suction nose 32 is extended.

Figure 2:
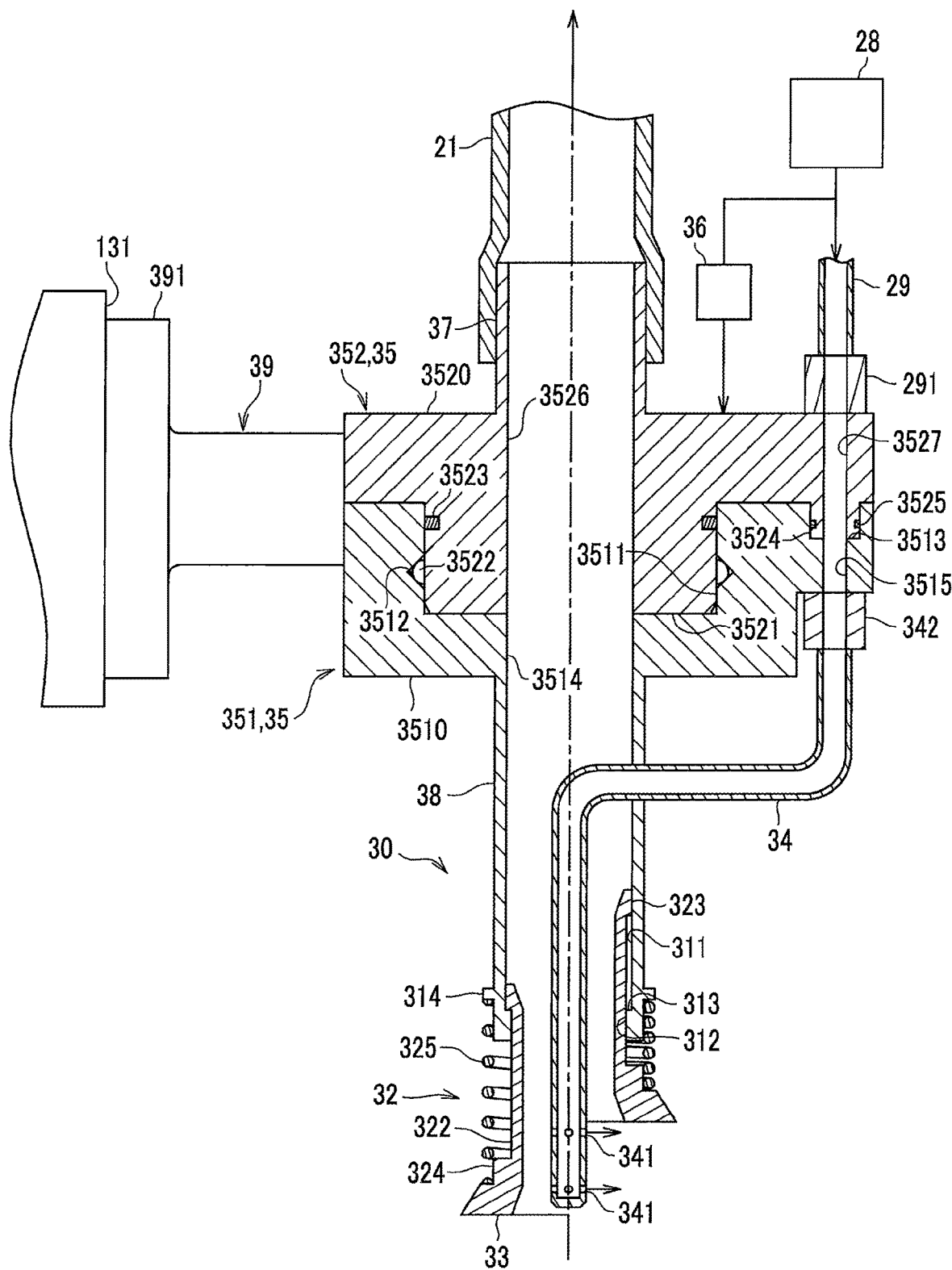
FIG. 2 is an enlarged sectional view of a nozzle according to the first embodiment.

With reference to FIG. 2, the compressed air feeder 28 may include an air compressor and an air on-off valve.

The air tube 29 connects the compressed air feeder 28 to the lance 34. The air tube 29 may be flexible. The air tube 29 may extend along the suction duct 21.

The inspection device 10 may include a nozzle exchanger 35 and an electromagnetic valve 36. The nozzle exchanger 35 includes a master cylinder 352 and an adapter 351. The master cylinder 352 is fixed to the support rod 39. The suction duct 21 is connected to the master cylinder 352. The suction pipe 38 is connected to the adapter 351. The adapter 351 may be detachable from the master cylinder 352 to allow mounting of an appropriate nozzle 30 onto the arm 13 in conformance to the shape of the inspection spot 18.

The master cylinder 352 includes a body 3520, a main protrusion 3521, a suction channel 3526, an air channel 3527, plungers 3522, a gasket 3523, a sub-protrusion 3524, and a gasket 3525. The body 3520 is cylindrical. The body 3520 has a cylindrical main protrusion 3521 at its center. The main protrusion 3521 has the suction channel 3526 extending through its center. The main protrusion 3521 includes multiple plungers 3522 radially extending in its center portion. The gasket 3523 is located at the outer peripheral surface of the main protrusion 3521. The body 3520 includes the cylindrical sub-protrusion 3524 parallel to the main protrusion 3521 near its peripheral surface. The gasket 3525 is located at the outer peripheral surface of the sub-protrusion 3524. The sub-protrusion 3524 has the air channel 3527 extending through its center. In some embodiments, a suction channel 3514, the suction channel 3526, and the suction pipe 38 have an identical inner diameter, and are coaxial. The air tube 29 is connected to the air channel 3527 with a joint 291.

The adapter 351 includes a body 3510, a main recess 3511, a suction channel 3514, a V-groove 3512, a sub-recess 3513, and an air channel 3515. The body 3510 is cylindrical. The body 3510 has the main recess 3511 at its center. The main recess 3511 is a cylindrical blind hole. The main recess 3511 receives the main protrusion 3521 fit in it. The main recess 3511 has the suction channel 3514 extending through its center. The suction channel 3514 is connected to the suction pipe 38. The main recess 3511 has the V-groove 3512 with a V-shaped cross-section in its vertically center portion. The V-groove 3512 extends circumferentially. The body 3510 has the sub-recess 3513 parallel to the main recess 3511 near its peripheral surface. The sub-recess 3513 is a cylindrical blind hole, which is radially smaller than the main recess 3511. The sub-recess 3513 receives the sub-protrusion 3524 fit in it. The sub-recess 3513 has the air channel 3515 extending through its center. The lance 34 is connected to the air channel 3515 with a joint 342.

When the adapter 351 is attached to the master cylinder 352, the main protrusion 3521 and the sub-protrusion 3524 are respectively received in the main recess 3511 and the sub-recess 3513, and the plungers 3522 protrude into the V-groove 3512. This fixes the adapter 351 to the master cylinder 352. The suction channel 3514 and the suction channel 3526 are hermetically sealed with the gasket 3523. The air channel 3515 and the air channel 3527 are hermetically sealed with the gasket 3525.

The electromagnetic valve 36 is located between the compressed air feeder 28 and the master cylinder 352. The electromagnetic valve 36 is a directional control valve. When the electromagnetic valve 36 is switched to the connection mode, the compressed air fed from the compressed air feeder 28 through the channel (not shown) within the master cylinder 352 pushes the plungers 3522 outward, causing the ends of the plungers 3522 to protrude into the V-groove 3512. This connects the adapter 351 to the master cylinder 352. When the electromagnetic valve 36 is switched to the disconnection mode, the ends of the plungers 3522 are pulled inward by the urging force of a spring (not shown). This disconnects the adapter 351 from the master cylinder 352.

When the inspection device 10 does not include the lance 34, the air channel 3515, the air channel 3527, and the gasket 3525 may be eliminated.

Figure 3:
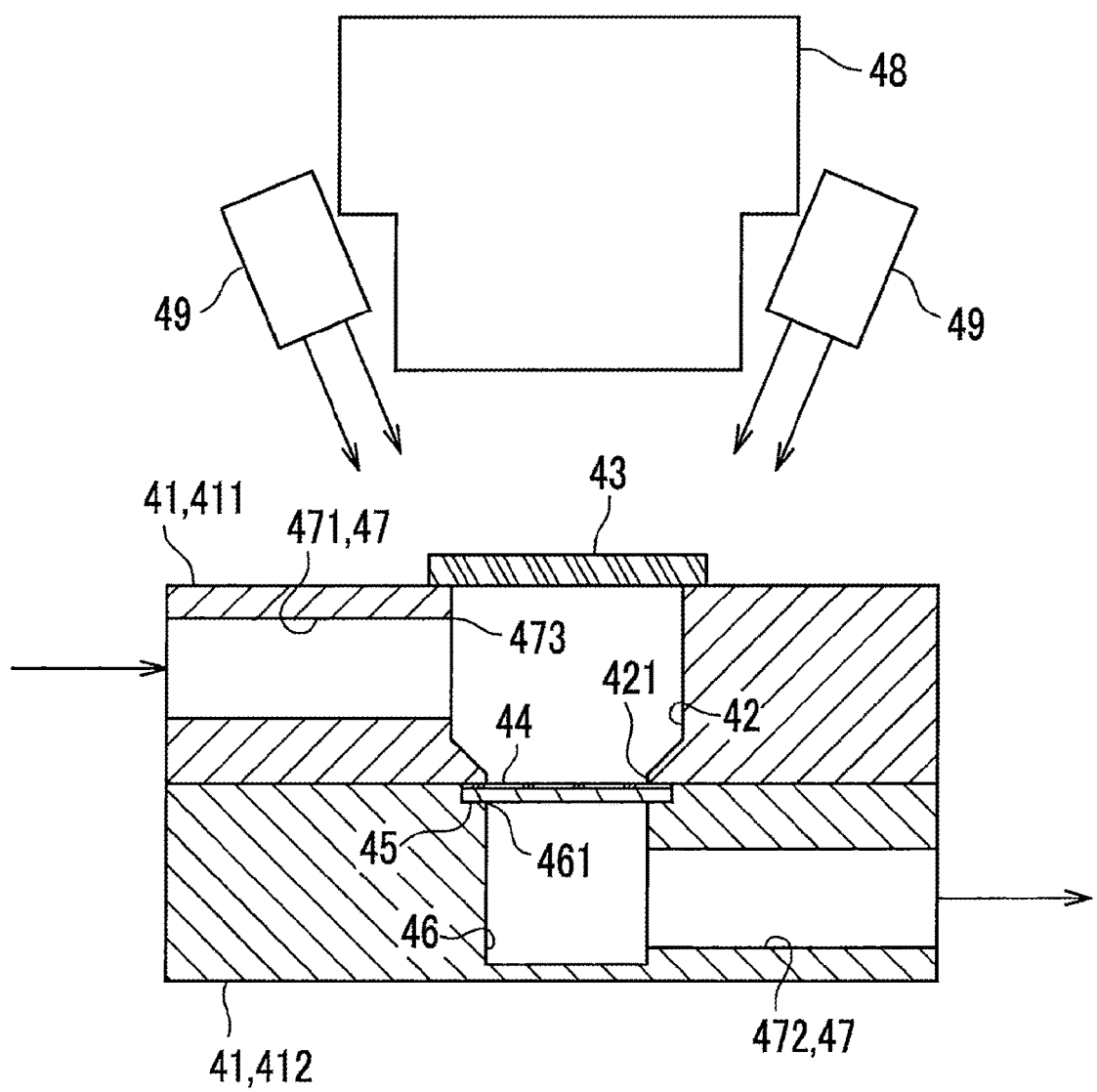
FIG. 3 is an enlarged sectional view of a detector according to the first embodiment.

The detector 40 will now be described with reference to FIG. 3. The detector 40 includes a body (housing) 41, a capture chamber 42, a window 43, a filter 44, a support body (support) 45, a buffer chamber 46, a camera (imaging device) 48, and illuminators 49. The body 41 is rectangular, and includes an upstream body 411 and a downstream body 412.

The upstream body 411 has a capture chamber 42 at its center. The capture chamber 42 is cylindrical and hollow. The capture chamber 42 extends through the upstream body 411 from the outer surface into the downstream body 412. The capture chamber 42 has its outer end closed with the window 43. The capture chamber 42 has a filter connection port 421 at its end facing the downstream body 412. The capture chamber 42 has a suction path connection port 473 in its cylindrical surface. A suction channel 471 extends through the upstream body 411 from the outer surface of the upstream body 411 through the suction path connection port 473. The suction duct 21 is connected to the suction channel 471.

The downstream body 412 includes a disc-shaped support body 45 at its center. The support body 45 supports the filter 44. The support body 45 allows a gas to flow through. The support body 45 is, for example, a metal mesh, a porous plate, or a honeycomb plate. The filter 44 is held between the support body 45 and the filter connection port 421. The filter 44 and the support body 45 are slightly larger than the filter connection port 421. The filter 44, the support body 45, and the filter connection port 421 are arranged concentrically. A hollow buffer chamber 46 having an opening 461 is located below the support body 45. The buffer chamber 46 is cylindrical. A suction channel 472 is connected to the buffer chamber 46. The suction channel 472 is connected to the exhauster 25. The sucked air flows through the suction channel 471, the capture chamber 42, the filter 44, the support body 45, the buffer chamber 46, and the suction channel 472, and is released. The sucked foreign object moves through the suction channel 471 and the capture chamber 42 and is captured on the filter 44.

The camera 48 is used to observe a foreign object 51 captured on the surface of the filter 44 through the window 43 and the capture chamber 42. The camera 48 is, for example, an optical camera. The camera 48 has a lens facing the window 43.

The camera 48 can have a shallow depth of field. For example, the camera 48 may have a depth of field of 0.002 to 0.05 mm. The camera 48 may also include a subject distance changer that can automatically change the subject distance. The camera 48 having a shallow depth of field and including a subject distance changer can form filter images 53 at several different subject distances. The camera 48 may include a contrast calculation unit. The camera 48 extracts a focused portion of each of the images formed at different subject distances using the calculated contrast. The camera 48 forms each filter image 53 (refer to FIG. 9) by combining the images formed at different subject distances. An extractor 63 (refer to FIG. 5) calculates the height of the foreign object 51 (refer to FIGS. 8A and 8B) based on the focused subject distance.

The illuminators 49 illuminate the surface of the filter 44 through the window 43. The illuminators 49 are, for example, spotlights.

Figure 4:
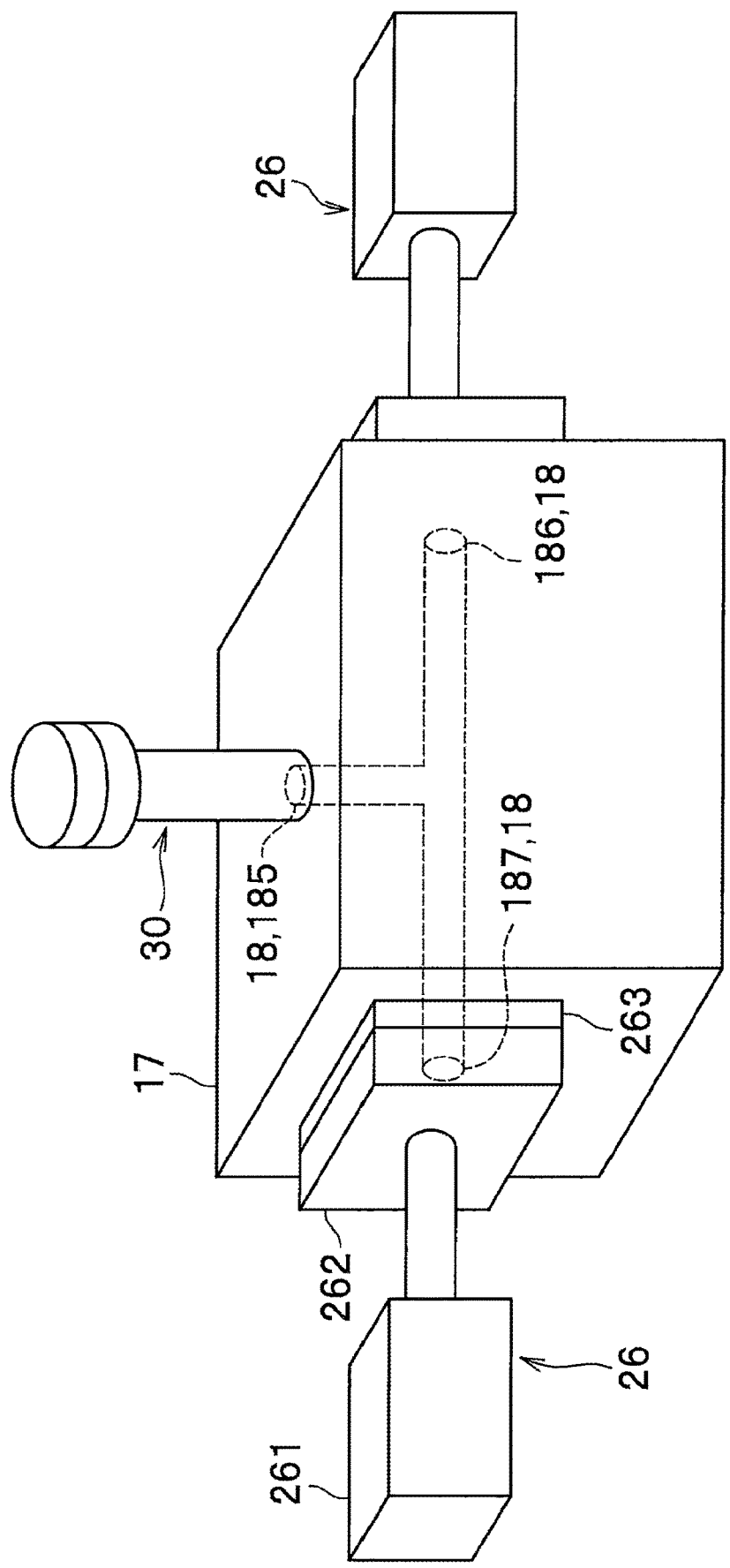
FIG. 4 is an enlarged perspective view of sealing devices according to the first embodiment.

The sealing devices 26 will now be described with reference to FIG. 4. When an inspection spot 185 is one of the openings of a cross-hole, the sealing devices 26 seal openings 186 and 187 other than the inspection spot 185 to be in contact with the nozzle 30. Each sealing device 26 includes a cylinder 261, a support plate 262, and a sealer 263. The cylinder 261 is a fluid cylinder, such as an air cylinder. The support plate 262 is moved by the cylinder 261. For example, the support plate 262 is fixed to the cylinder rod of the cylinder 261. When the cylinder rod is extended, the sealer 263 is pressed against the workpiece 17. When the cylinder rod is contracted, the sealer 263 separates from the workpiece 17, and moves to its retracted position. The sealers 263 seal the openings 186 and 187. The sealers 263 are, for example, rubber plates or O-rings. Each sealer 263 is supported by the corresponding support plate 262. When the nozzle 30 is in contact with the inspection spot 185, the sealing devices 26 seal the openings 186 and 187 other than the inspection spot 185. After the suction at the inspection spot 185 is complete, the sealing devices 26 retract the sealers 263 to unseal the openings 186 and 187.

Figure 5:
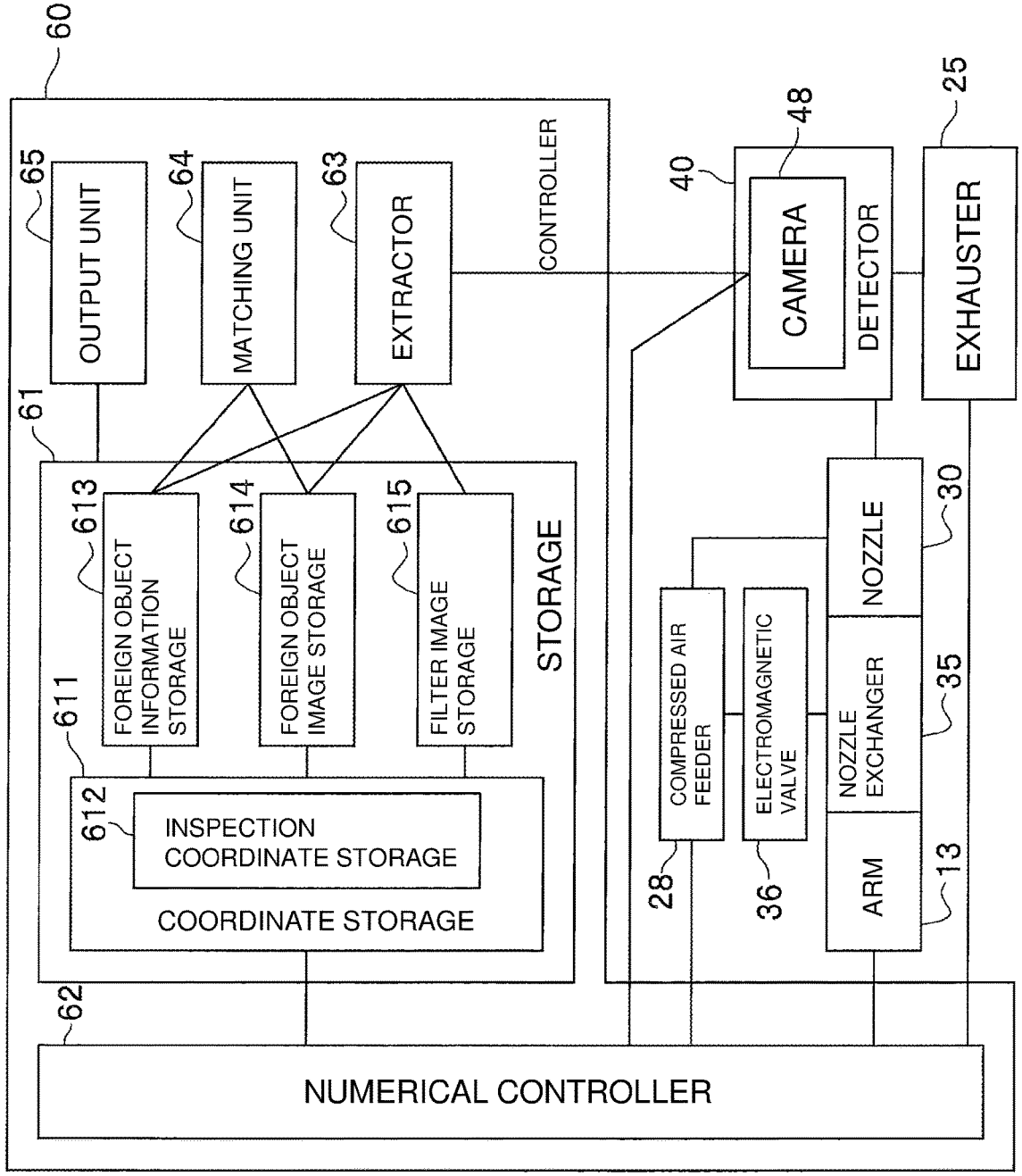
FIG. 5 is a block diagram of a foreign object inspection device according to the first embodiment.

A controller 60 will now be described with reference to FIG. 5. The controller 60 includes a storage 61, a numerical controller 62, an extractor 63, a matching unit 64, and an output unit 65.

The storage 61 includes a main storage (memory) and a sub-storage (storage). The storage 61 includes a coordinate storage 611, a filter image storage 615, a foreign object image storage 614, and a foreign object information storage 613.

The coordinate storage 611 includes an inspection coordinate storage 612. The coordinate storage 611 stores, as a numerical control program, coordinates, movement commands, dwells, and tool numbers used for the numerical controller 62 to drive the arm 13. The inspection coordinate storage 612 stores coordinates and movement commands used to place the nozzle 30 in contact with the inspection spot 18. The inspection coordinate storage 612 may store the inspection spot members.

The filter image storage 615 stores the filter images 53 (refer to FIG. 9) in a manner associated with the inspection spot numbers or the inspection coordinates. The filter image storage 615 stores multiple filter images 53 formed by the camera 48 at different focal lengths for each inspection spot number or each set of inspection coordinates. The filter image storage 615 may store a composite image by combining focused portions of the filter images 53 together.

The foreign object image storage 614 stores foreign object images 52 (collectively for foreign object images 521 to 526 in FIG. 9) for each inspection spot 18. Each foreign object image 52 is an image of the foreign object 51 (refer to FIGS. 8A and 8B) extracted from the filter image 53.

The foreign object information storage 613 stores individual information about the foreign objects 51 (foreign object information), such as a foreign object image 52, the length, the width, the area, the color, and the height of each foreign object 51 for the inspection spot 18. The length of each foreign object 51 is the maximum distance between two points on the outer periphery. The width of each foreign object 51 is the diameter of the largest inscribed circle. The foreign object information storage 613 stores the inspection spot number or the inspection coordinate and the foreign object image 52 of each foreign object 51 for the inspection spot 18.

The numerical controller 62 controls the arm 13 using the coordinates and movement commands stored in the coordinate storage 611. The numerical controller 62 includes a timer. The numerical controller 62 may be selectable from a variety of controllers that control the arm 13 using the coordinates (e.g., controllers that store an intended destination through direct teaching). The numerical controller 62 controls the compressed air feeder 28, the exhauster 25, and the detector 40.

The extractor 63 extracts the foreign object images 52 contained in the filter images 53. The extractor 63 extracts the contour of each foreign object image 52 using the difference in color or height between the background and the foreign object 51. The extractor 63 extracts, from each foreign object image 52, information about the corresponding foreign object 51 including the length, the width, the area, the color, or the height of the foreign object 51. The extractor 63 may extract only foreign objects having a length equal to or greater than a specified length. The specified length is input by a user and prestored in the storage 61. The extractor 63 is, for example, a known foreign object extractor (e.g., the measuring device described in Patent Literature 1).

The output unit 65 includes a display, such as a liquid crystal monitor. The output unit 65 displays the foreign object images 52 for each inspection spot 18 and information about the foreign object images 52.

Figure 9:
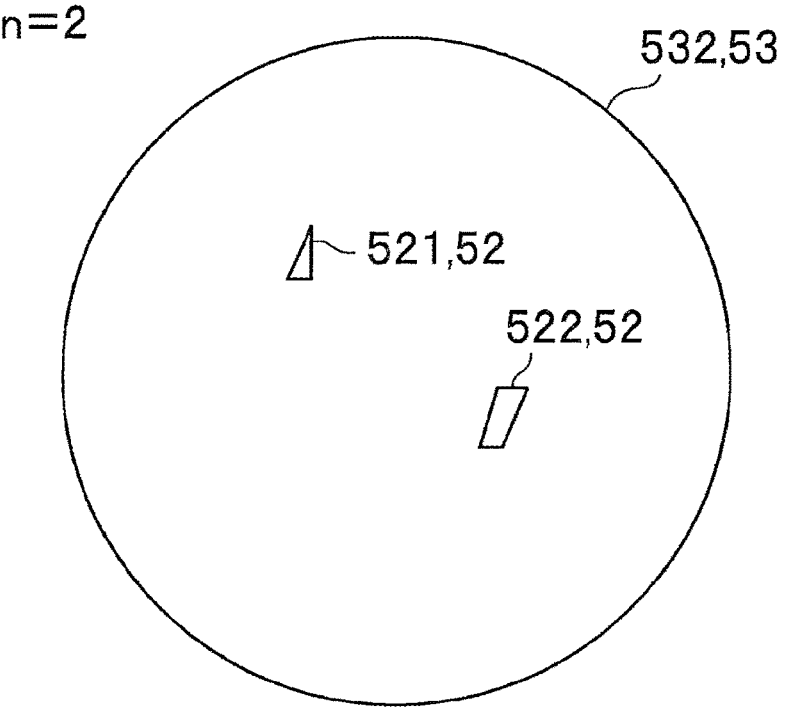
FIG. 9 is a schematic diagram of filter images according to the first embodiment.
Figure 9:
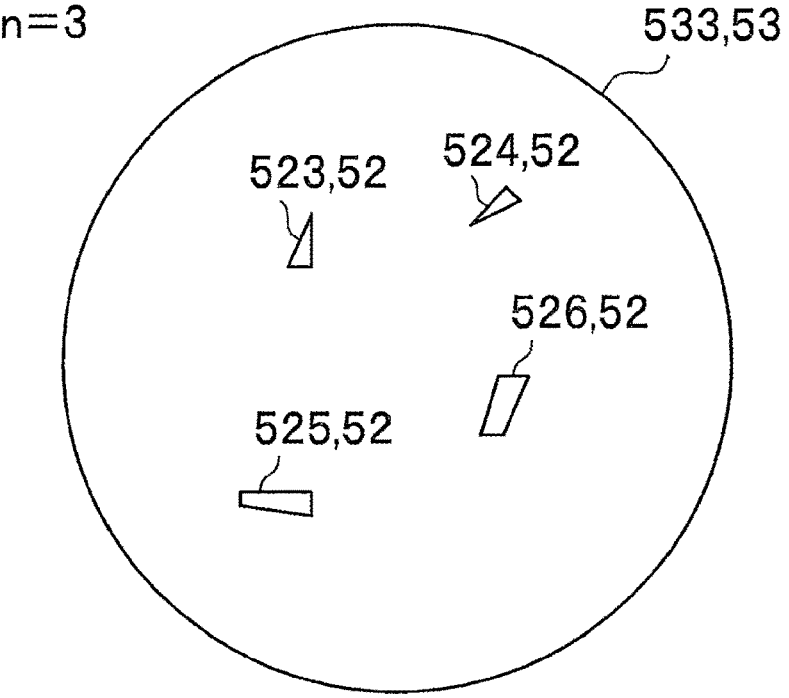

Referring now to FIG. 9, the matching unit 64 matches foreign object images 523 to 526 extracted from a filter image 533 for the inspection spot number n (n=3 in FIG. 9) to foreign object images 521 and 522 for the inspection spot number n−1 (n=2 in FIG. 9). The matching unit 64 extracts the appearance features, calculates rotational, symmetric, and scaling transformation, and determines whether the images match each other. The matching unit 64 matches the foreign object image 521 to the foreign object image 523, and the foreign object image 522 to the foreign object image 526. The matching unit 64 then associates unmatching foreign object images 524 and 525 with the inspection spot number 3 as newly sucked foreign objects.

An inspection method will now be described with reference to FIG. 6. The arm 13 moves the suction port 33 to be in contact with a first inspection spot 18 (S2). The exhaust valve 251 is open for the suction port 33 to start sucking (S3). The lance 34 jets compressed air (S4). The lance 34 is inserted into the inspection spot 18 (S5). The foreign object 51 is sucked and captured on the filter 44 (S6). The lance 34 stops jetting the compressed air (S7). The exhaust valve 251 is closed to stop sucking (S8). The camera 48 forms a filter image 53 (S9). The extractor 63 extracts a foreign object image 52 from the filter image 53 (S10). The matching unit 64 matches the foreign object image 52 extracted at the preceding inspection spot to the foreign object image 52 extracted at the current inspection spot. As a result, an image of the foreign object newly extracted at the current inspection spot is stored in a manner associated with the current inspection spot (S11). The extractor 63 extracts the foreign object information from the foreign object image 52 newly extracted at the current inspection spot (S12). The processing in steps S2 to S10 is repeated for each inspection spot (S1, S13, and S14).

The steps will be described in detail.

Figure 6:
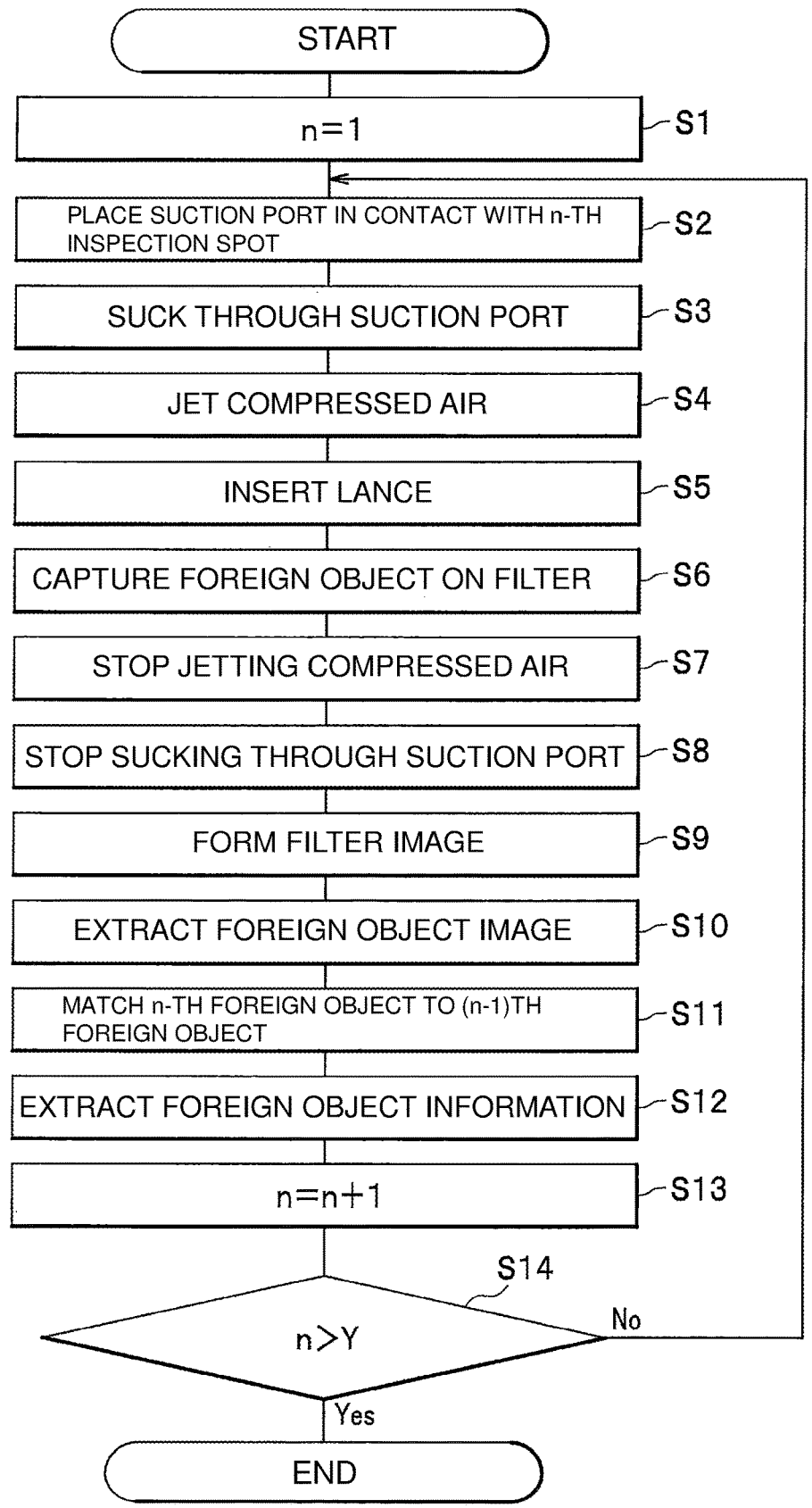
FIG. 6 is a flowchart of an inspection method according to the first embodiment.
Figure 7:
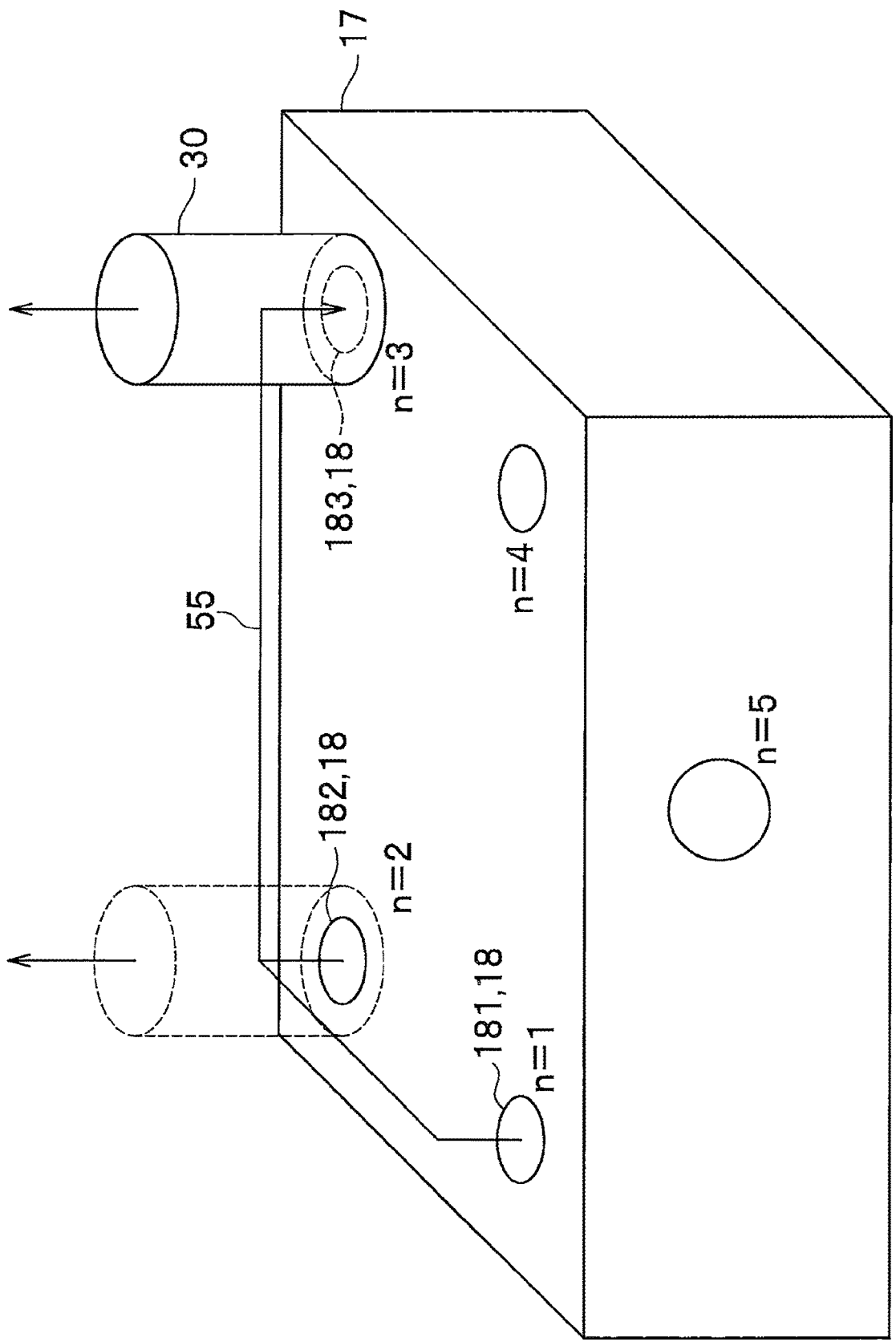
FIG. 7 is a perspective view of a workpiece being inspected according to the first embodiment.

For ease of explanation, FIG. 6 shows steps S1, S13, and S14 as simple repeated operations. Through steps S1 to S14, the numerical controller 62 controls the arm 13, the detector 40, and the exhauster 25 in the order specified in the numerical control program stored in the coordinate storage 611. As shown in FIG. 7, the arm 13 moves along a programed route 55 to place the nozzle 30 sequentially in contact with the inspection spots 181 to 185 of the workpiece 17 and to insert the lance 34 into each inspection spot.

Figure 8B:
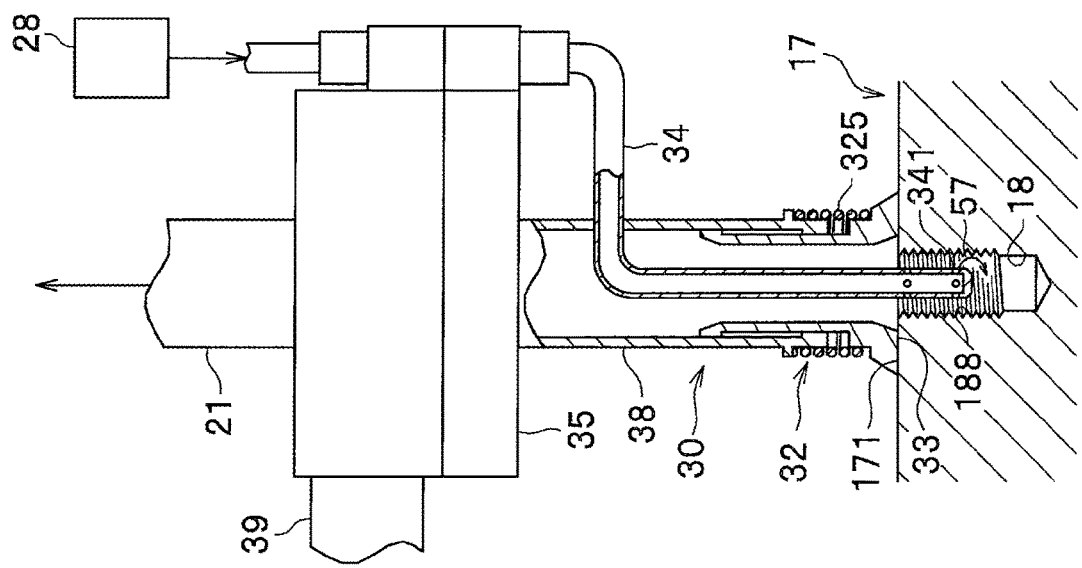
FIG. 8B is a partial sectional view illustrating a method for using the nozzle according to the first embodiment.
Figure 8A:
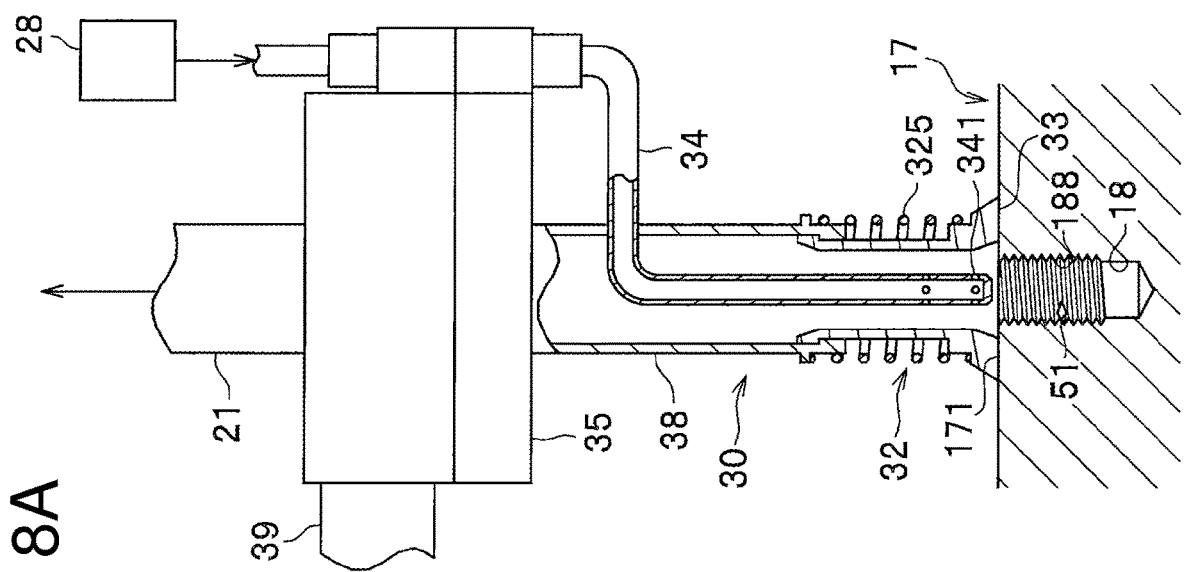
FIG. 8A is a partial sectional view illustrating a method for using the nozzle according to the first embodiment.

The processing in steps S2 to S8 will be described with reference to FIGS. 8A and 8B. The arm 13 first moves the suction port 33 toward the inspection spot 18 to a position substantially perpendicular to a workpiece surface 171. As shown in FIG. 8A, the suction port 33 is placed in contact with the inspection spot 18 (S2). Subsequently, the numerical controller 62 activates the exhauster 25 and opens the exhaust valve 251 to release air from the inspection spot 18, the suction pipe 38, and the suction duct 21 (S3). Subsequently, the numerical controller 62 causes the compressed air feeder 28 to feed compressed air. The compressed air jets through the orifices 341 after flowing through the nozzle exchanger 35 and the lance 34 (S4).

The arm 13 further presses the nozzle 30 against the workpiece 17. The helical spring 325 then contracts, and the suction nose 32 slides into the suction pipe 38. As shown in FIG. 8B, the lance 34 is then inserted into the inspection spot 18 (S5). The suction port 33 is still in contact with the workpiece surface 171. A jet of compressed air jetted through the orifices 341 forms a swirl flow 57 along a screw thread 188. The foreign object 51 adhering to the screw thread 188 is drawn into the swirl flow 57 and sucked through the suction port 33.

The lance 34 is inserted to a position slightly above the bottom of the inspection spot 18, and is then raised. After the lance 34 is raised, the suction port 33 is still in contact with the inspection spot 18. The lance 34 may be inserted repeatedly.

The nozzle 30 with the suction nose 32 and the lance 34 can have the lance 34 insertable into the inspection spot 18. The swirl flow 57 can thus reach a deep end of the inspection spot 18, removing the foreign object 51 from the inspection spot 18.

In step S6, the foreign object 51 inside the inspection spot 18 is sucked through the suction port 33. The sucked foreign object 51 moves through the suction duct 21 and the suction channel 471 into the capture chamber 42, and is captured on the surface of the filter 44. The sucked air flows through the filter 44, the support body 45, the buffer chamber 46, and the suction channel 472, and is released by the exhauster 25.

The numerical controller 62 measures the moving time from when the lance 34 is raised. The moving time is the time taken for the sucked foreign object 51 to move until being captured by the filter 44. While the numerical controller 62 waits for the moving time, the exhauster 25 continues to suck through the suction port 33.

Subsequently, the numerical controller 62 controls the compressed air feeder 28 to stop feeding compressed air (S7). The numerical controller 62 then closes the exhaust valve 251 (S8). In step S8, the exhauster 25 may be stopped.

For the inspection device 10 including the sealing devices 26, the sealing devices 26 seal the openings 186 and 187 before step S2. After step S8, the sealing devices 26 unseal the openings 186 and 187.

In step S9, the numerical controller 62 lights the illuminators 49. The numerical controller 62 drives the camera 48. The camera 48 forms an image of the filter 44 through the window 43. The camera 48 stores the obtained filter image 53 into the filter image storage 615.

In step S10, the extractor 63 reads the filter image 53 from the filter image storage 615, and extracts foreign object images 523 to 526 from a filter image 532. In this example, the extractor 63 has previously extracted foreign object images 521 and 522. The extracted foreign object images 523 to 526 are stored into the foreign object image storage 614.

Step S11 will be described with reference to FIG. 9. The matching unit 64 matches the foreign object images 521 and 522 contained in the previous (n=2) filter image 532 to the foreign object images 523 to 526 contained in the current (n=3) filter image 533 in the foreign object image storage 614. After the matching, the matching unit 64 determines the unmatching foreign object images 524 and 525 to be the foreign objects 51 for the inspection spot 183. The foreign object information storage 613 stores the foreign object images 524 and 525 into the foreign object information storage 613 in a manner associated with the inspection spot number or the inspection coordinates.

In step S12, the extractor 63 extracts the foreign object information about the foreign objects 51, such as the length of the foreign object images 524 and 525 for the inspection spot 183 (refer to FIG. 7). The foreign object information storage 613 stores the foreign object information together with the foreign object images 524 and 525.

Figure 10:
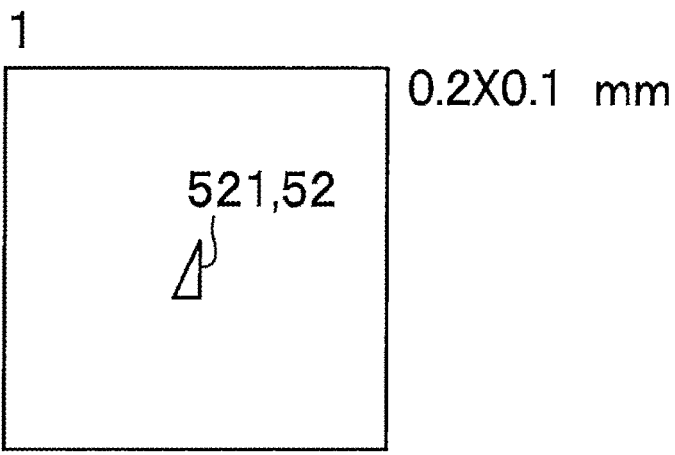
FIG. 10 is a schematic diagram of foreign object images extracted for inspection spots according to the first embodiment.
Figure 10:
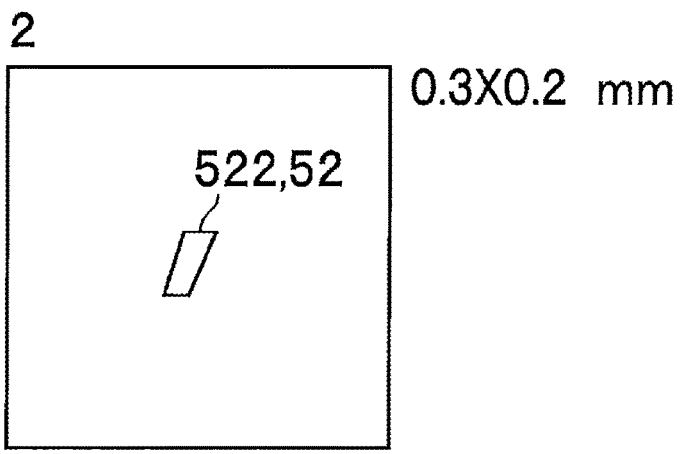
Figure 10:
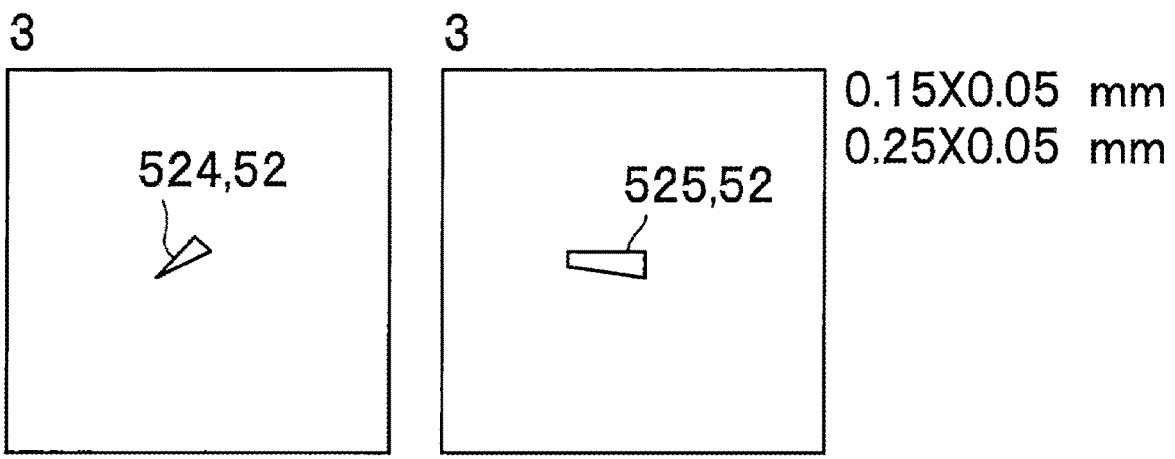

As shown in FIG. 10, the output unit 65 outputs, for each inspection spot 18, the foreign object images 52 for the inspection spot 18 and the information about the foreign object images. The numerical values in FIG. 10 represent the length by the width in some examples.

The processing in steps S10 to S12 may be performed successively after the suction and the imaging (S2 to S9) are complete for every inspection spot 18. The value Y in the flowchart is the total number of inspection spots 18.

The inspection device 10 according to the present embodiment obtains the foreign object images 52 of the foreign objects 51 adhering to the workpiece 17 in a manner associated with the corresponding inspection spots 18. The inspection device 10 can thus determine the position or the shape of each foreign object 51. The inspection device 10 may be used for inspection after cleaning, enabling quantitative evaluation of the cleaning effect for each part of the workpiece.

After the foreign object images 52 are extracted from the filter images 53, the inspection device 10 performs matching using the foreign object images 52 contained in the filter images 53 for each inspection spot 18. This allows the inspection device 10 to determine the correct shape or number of the foreign objects 51, although the foreign objects 51 may move or be reversed on the filter 44 during the inspection.

The inspection device 10 can store the filter images 53. The inspection device 10 can extract data from the filter images 53 stored in, for example, a storage after the inspection is complete. The inspection device 10 can compare data obtained under different data extraction conditions to improve data reliability.

Second Embodiment

Figure 12:
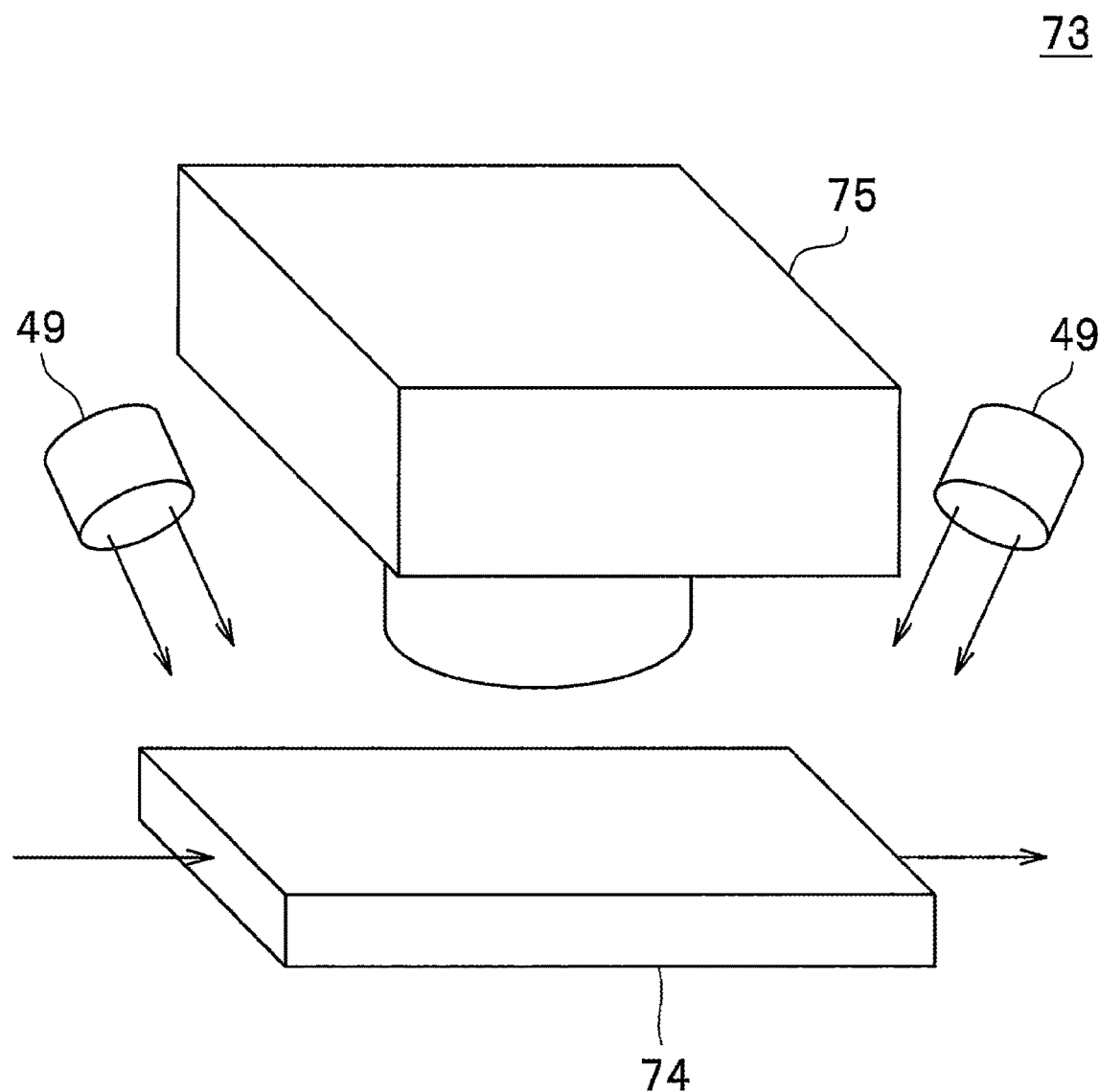
FIG. 12 is an enlarged perspective view of a detector according to the second embodiment.
Figure 13:
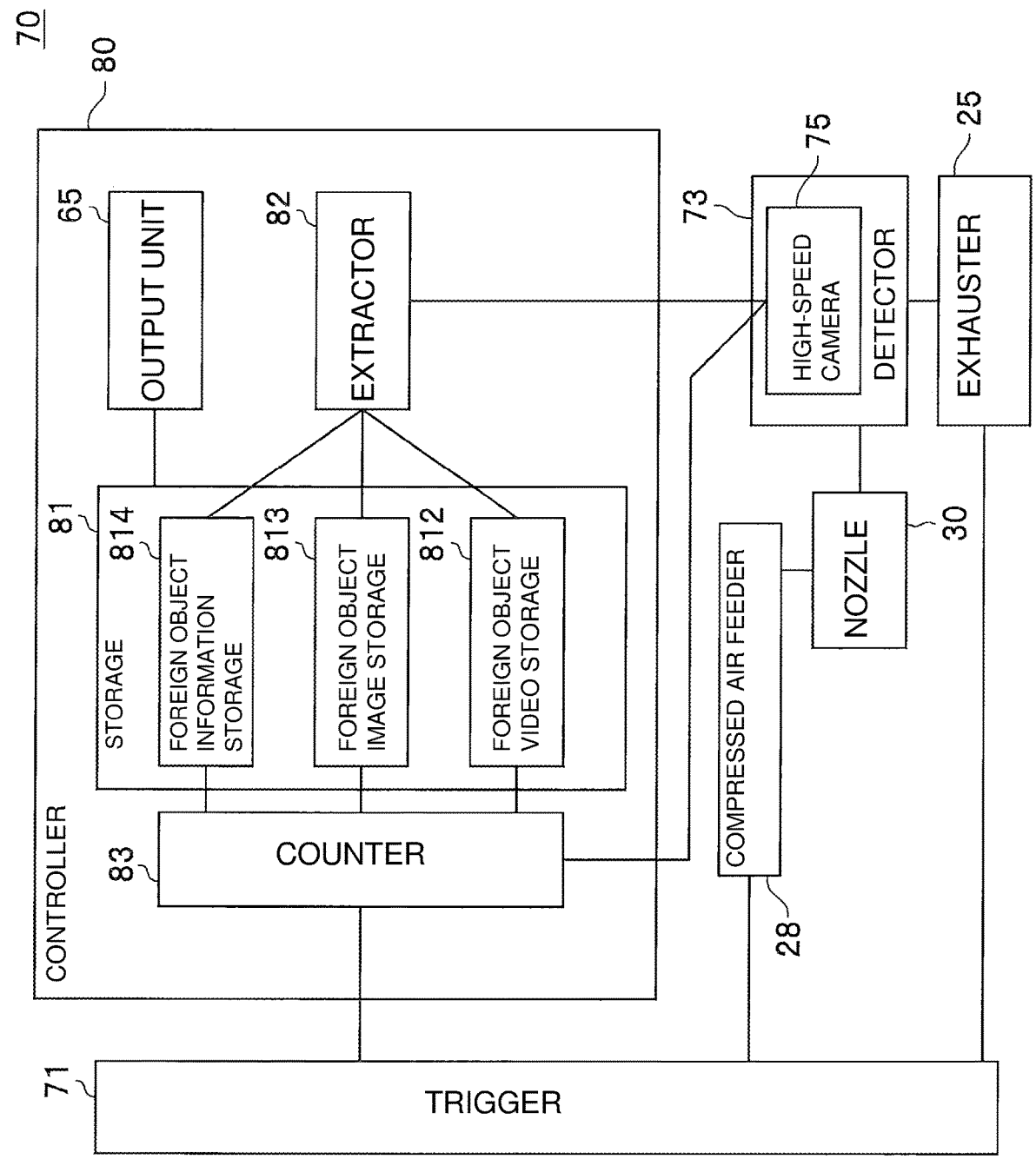
FIG. 13 is a block diagram of a foreign object inspection device according to the second embodiment.

An inspection device 70 according to a second embodiment will now be described with reference to FIGS. 11 to 13. Unlike the inspection device 10 according to the first embodiment, the inspection device 70 according to the present embodiment does not include the arm 13. The present embodiment differs from the first embodiment in the detector and the controller. The inspection device 70 includes a trigger 71, a detector 73, and a controller 80. The detector 73 includes a high-speed camera 75. The nozzle 30 may include a grip 72. The other components in the present embodiments are the same as those of the inspection device 10.

The trigger 71 is, for example, a foot switch or a trigger attached to the nozzle 30. When activated, the trigger 71 generates a trigger signal.

The detector 73 will now be described with reference to FIG. 12. The detector 73 includes a transparent channel 74, the high-speed camera 75, and illuminators 49. The transparent channel 74 is formed from a transparent material such as polycarbonate, acrylic resin, tempered glass, or sapphire glass. The transparent channel 74 is a thin channel having a rectangular cross-section. The transparent channel 74 having a thin cross-section is likely to have a uniform flow inside and to have any foreign objects 51 moving at a constant speed through the transparent channel 74. The transparent channel 74 may include a hard film inside. The high-speed camera 75 is oriented perpendicularly to the direction in which the transparent channel 74 extends. For the transparent channel 74 having a thin cross-section, the high-speed camera 75 has the lens oriented toward the thinner side of the cross-section. The high-speed camera 75 may preferably have an imaging speed of 4,000 to 10,000 fps for high-speed transfer. The high-speed camera 75 preferably includes a close-up lens to form images of foreign objects with a size of 0.1 to 0.5 mm. The high-speed camera 75 is controlled by a counter 83.

The transparent channel 74 may include an observation window, which is formed from a transparent material, and a housing, which is formed from an opaque material, to which the observation window is attached. The transparent channel 74 with the above structure may have the observation window made of tempered glass or sapphire glass, and the other parts made of metal. The transparent channel 74 with this structure is less costly and has intended strength.

Figure 11:
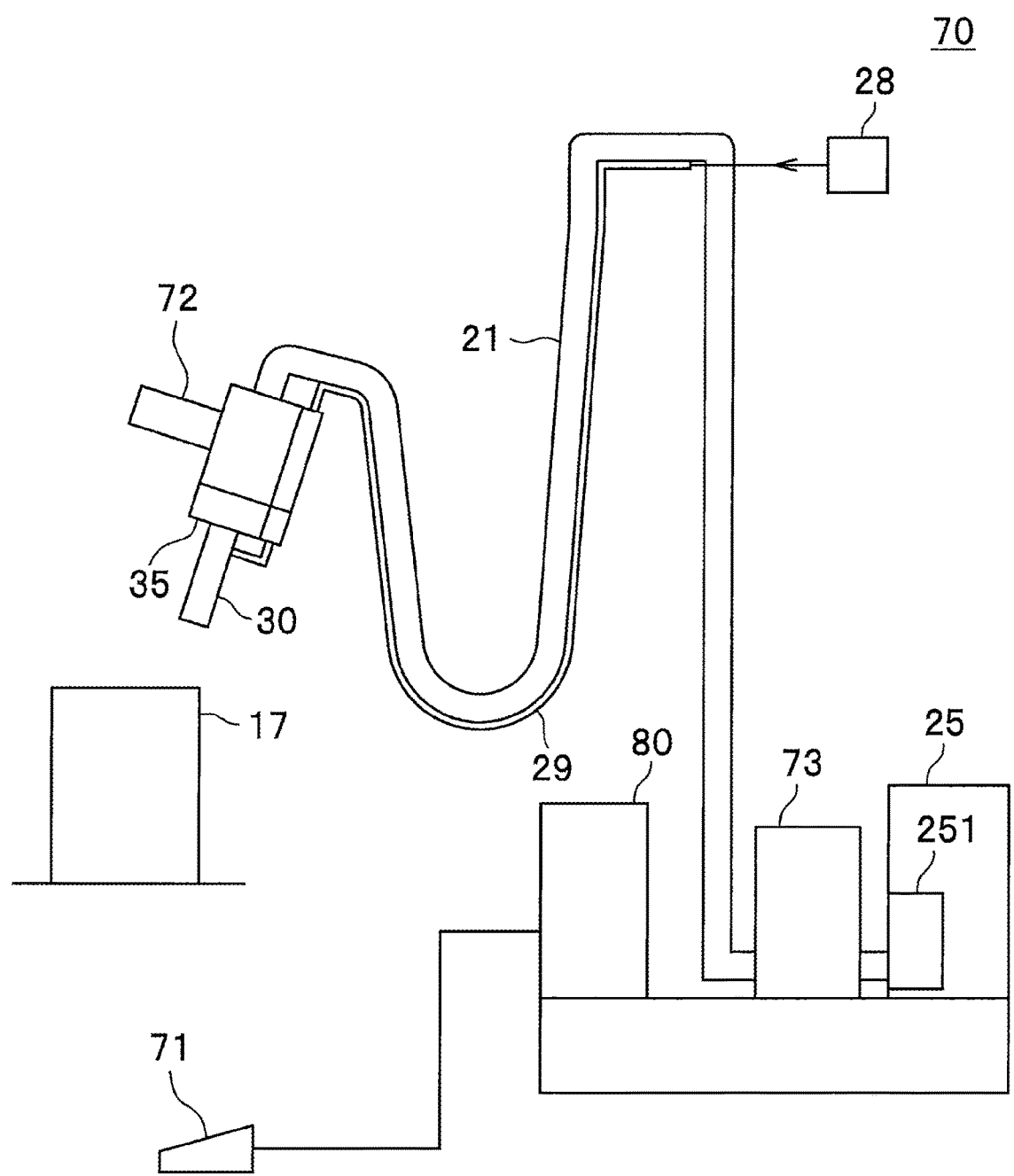
FIG. 11 is a schematic diagram of a foreign object inspection device showing its overall structure according to a second embodiment.

The inspection device 70 may eliminate the nozzle exchanger 35 (refer to FIG. 11). The nozzle exchanger 35 is manually detachable.

The controller 80 will now be described with reference to FIG. 13. The controller 80 includes a counter 83, a storage 81, and an extractor 82.

The counter 83 counts signals from the trigger 71. The counter 83 serves as a timer. The counter 83 measures the imaging standby time from when the trigger 71 is activated. The imaging standby time corresponds to the time taken for the foreign object 51 sucked from the nozzle 30 to arrive at the detector 73. The imaging standby time may be set to about 0.5 to 1 second shorter than the moving time taken from when suction of the foreign object 51 is started to when the foreign object 51 is detected. The counter 83 also measures the moving time from when the trigger 71 is deactivated. The counter 83 counts the trigger number, which is the number of times the trigger 71 is activated. The counter 83 transmits the trigger number to the storage 81. The counter 83 measures the standby time upon receipt of the trigger signal. Upon elapse of the standby time, the counter 83 causes the compressed air feeder 28 to feed compressed air to the nozzle 30. The standby time is preset in the counter 83. The standby time is, for example, 1 to 5 seconds.

The extractor 82 extracts foreign object videos containing the foreign objects 51 from the entire video taken by the high-speed camera 75. The extractor 82 extracts, from the entire video or from the foreign object videos, a frame containing the clearest entire image of the foreign object 51 as a foreign object image.

The extractor 82 extracts the contour of the foreign object 51 using, for example, the difference between the background color and the color of the foreign object 51. The background color and the color of the foreign object 51 are the lightness for a monochrome camera used as the high-speed camera 75. The extractor 82 extracts, from the foreign object images 52 for example, foreign object information about the foreign object 51 such as the length, the width, the area, the color, and the height of the foreign object 51. The extractor 82 may extract only foreign objects having a length greater than or equal to a specified length. The specified length is input by a user in advance, and is stored in the storage 81.

The storage 81 includes a foreign object image storage 813 and a foreign object information storage 814. The storage 81 may also include a foreign object video storage 812. The foreign object video storage 812 stores the foreign object video in a manner associated with the trigger number. The foreign object image storage 813 stores the foreign object image in a manner associated with the trigger number. The foreign object information storage 814 stores the trigger number, the foreign object image, and the foreign object information in a manner associated with one another.

Figure 14:
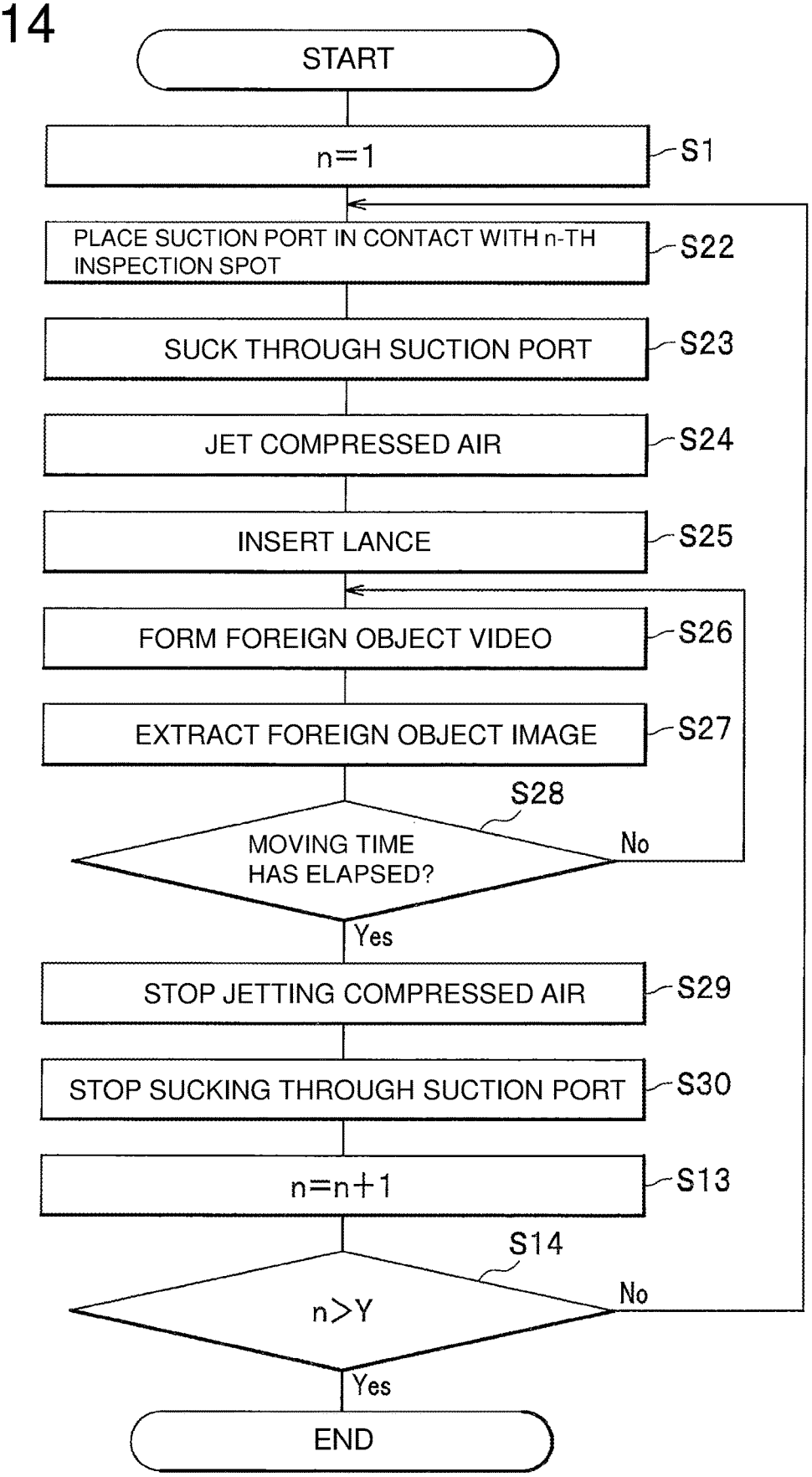
FIG. 14 is a flowchart of an inspection method according to the second embodiment.

A method for inspecting a foreign object using the inspection device 70 will now be described with reference to FIG. 14. An operator places the suction port 33 of the nozzle 30 in contact with the inspection spot 18 (S22). When the operator activates the trigger 71, the exhauster 25 starts releasing air and sucking through the suction port 33 (S23). The compressed air feeder 28 feeds compressed air to the nozzle 30. The lance 34 then jets compressed air (S24). The operator inserts the lance 34 into the inspection spot 18 (S25). The high-speed camera 75 takes a video (S26). The extractor 82 extracts a foreign object image from the foreign object video (S27). The counter 83 waits for the moving time (S28). The compressed air feeder 28 stops feeding air (S29). The exhauster 25 stops releasing air and sucking through the suction port 33 (S30).

In step S22, the operator moves the nozzle 30. The other processing is the same as in step S2.

In step S23, the operator activates the trigger 71. The exhauster 25 starts releasing air upon receipt of a trigger signal from the trigger 71. The nozzle 30 starts sucking.

In step S24, the compressed air feeder 28 feeds compressed air to the nozzle 30 after the standby time elapses from when the trigger 71 is activated.

The inspection device 70 may also include a second trigger for feeding compressed air. The compressed air feeder 28 feeds compressed air to the nozzle 30 while the second trigger is being activated.

In step S25, the operator manually moves the nozzle 30 into the inspection spot 18. The other processing is the same as in step S5.

In step S26, the counter 83 causes the high-speed camera 75 to start taking videos upon receipt of a trigger signal or after the imaging standby time elapses from reception of a trigger signal. The foreign object 51 is sucked from the inspection spot 18, moves through the suction duct 21, and reaches the transparent channel 74. The foreign object 51 moves through the transparent channel 74. The high-speed camera 75 takes a video of the foreign object 51 moving through the transparent channel 74. The foreign object 51 moves together with the airflow through the transparent channel 74 with a thin cross-section while having its wide surface facing the high-speed camera 75. The high-speed camera 75 can thus take a clear video of the foreign object 51.

In step S27, the extractor 82 extracts the foreign object video using the difference in contrast or in color. The extractor 82 stores the foreign object video into the foreign object video storage 812. The extractor 82 extracts a foreign object image 52 from the foreign object video. The extractor 82 stores the foreign object image 52 into the foreign object image storage 813. The extractor 82 extracts the foreign object information from the foreign object image 52, and stores the foreign object information into the foreign object information storage 814. The foreign object video, the foreign object image, and the foreign object information are stored together with the trigger number.

In step S28, the counter 83 measures the time from when the trigger signal disappears to when the moving time elapses. After the moving time elapses, the counter 83 causes the high-speed camera 75 to stop taking videos.

When the trigger 71 is activated again before the moving time elapses, the controller 80 may generate a warning. The storage 81 stores the extracted foreign object image together with the warning.

In some embodiments, the counter 83 may electromagnetically lock the trigger 71 to prevent an unintended activation until the moving time elapses.

In step S29, after the moving time elapses, the compressed air feeder 28 stops compressed air fed to the nozzle 30.

In step S30, after the moving time elapses, the exhauster 25 stops releasing air. The processing in step S30 may be performed after step S29. The fed compressed air is thus released by the exhauster 25. This operation prevents the foreign object adhering to the workpiece 17 from being removed by compressed air jetted through the orifices 341 when the nozzle 30 is removed from the inspection spot 18.

The inspection device 70 ends the inspection after the operator completes the processing in steps S22 to S30 for every inspection spot 18. The output unit 65 outputs the images of the detected foreign objects 51, together with the trigger numbers and the foreign object information.

The inspection device 70 may include a stop button. The inspection device 70 ends the inspection when the stop button is pressed. In some embodiments, the inspection device 70 may end the inspection when the trigger 71 is activated successively within a short period.

In the present embodiment, the nozzle 30 is manually movable by an operator. This facilitates inspection of a small number of workpieces 17. A manually operable device is particularly useful to measure a foreign object remaining inside a specific inspection spot 18.

The inspection device 70 including the high-speed camera 75 can form a clear image of the foreign object 51 moving through the transparent channel 74.

The inspection device 70 may include an arm 13, a numerical controller 62, and a coordinate storage 611. The numerical controller 62 controls the entire structure in place of the trigger 71 and the counter 83.

Third Embodiment

Figure 15:
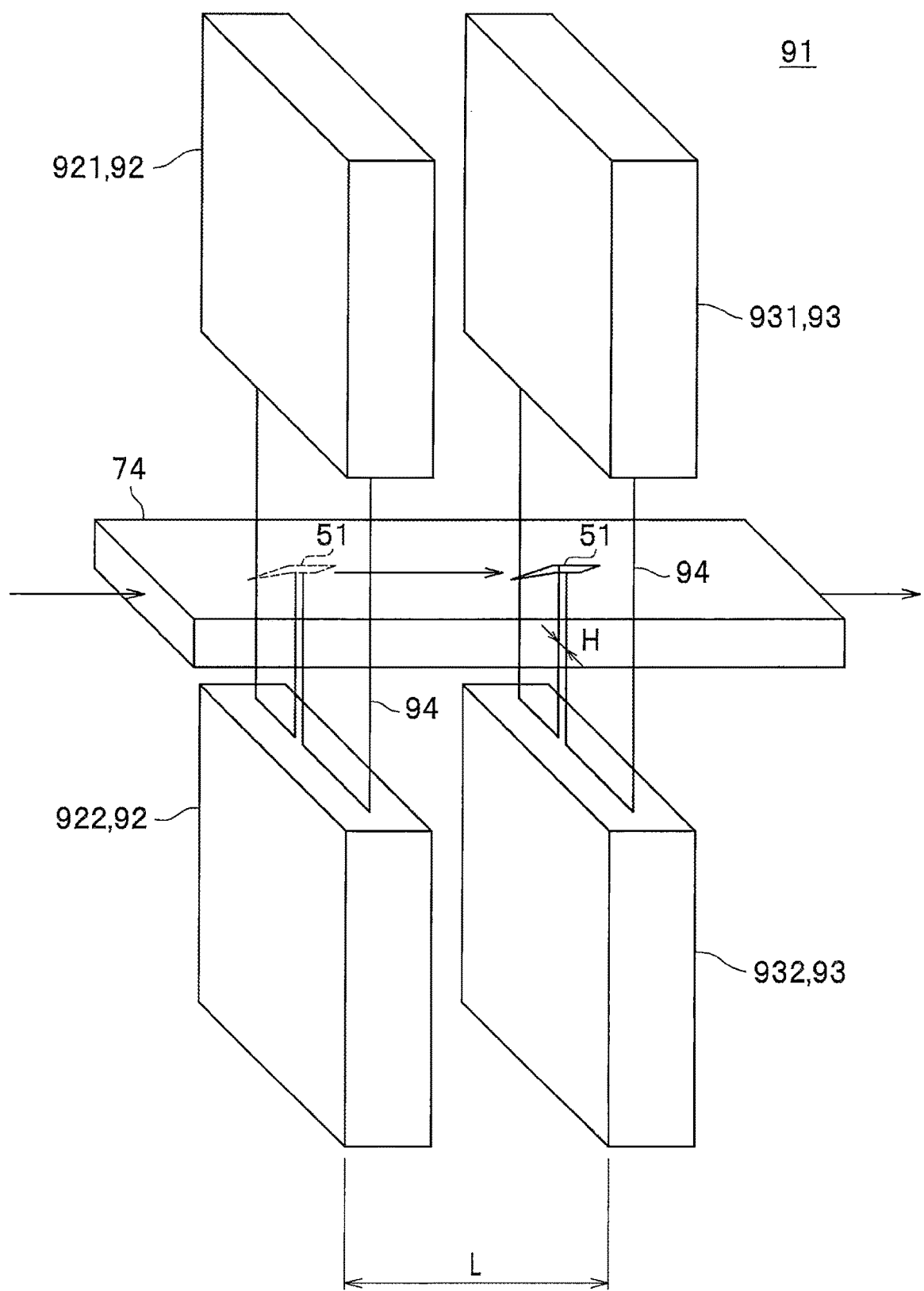
FIG. 15 is an enlarged perspective view of a detector according to a third embodiment.
Figure 16:
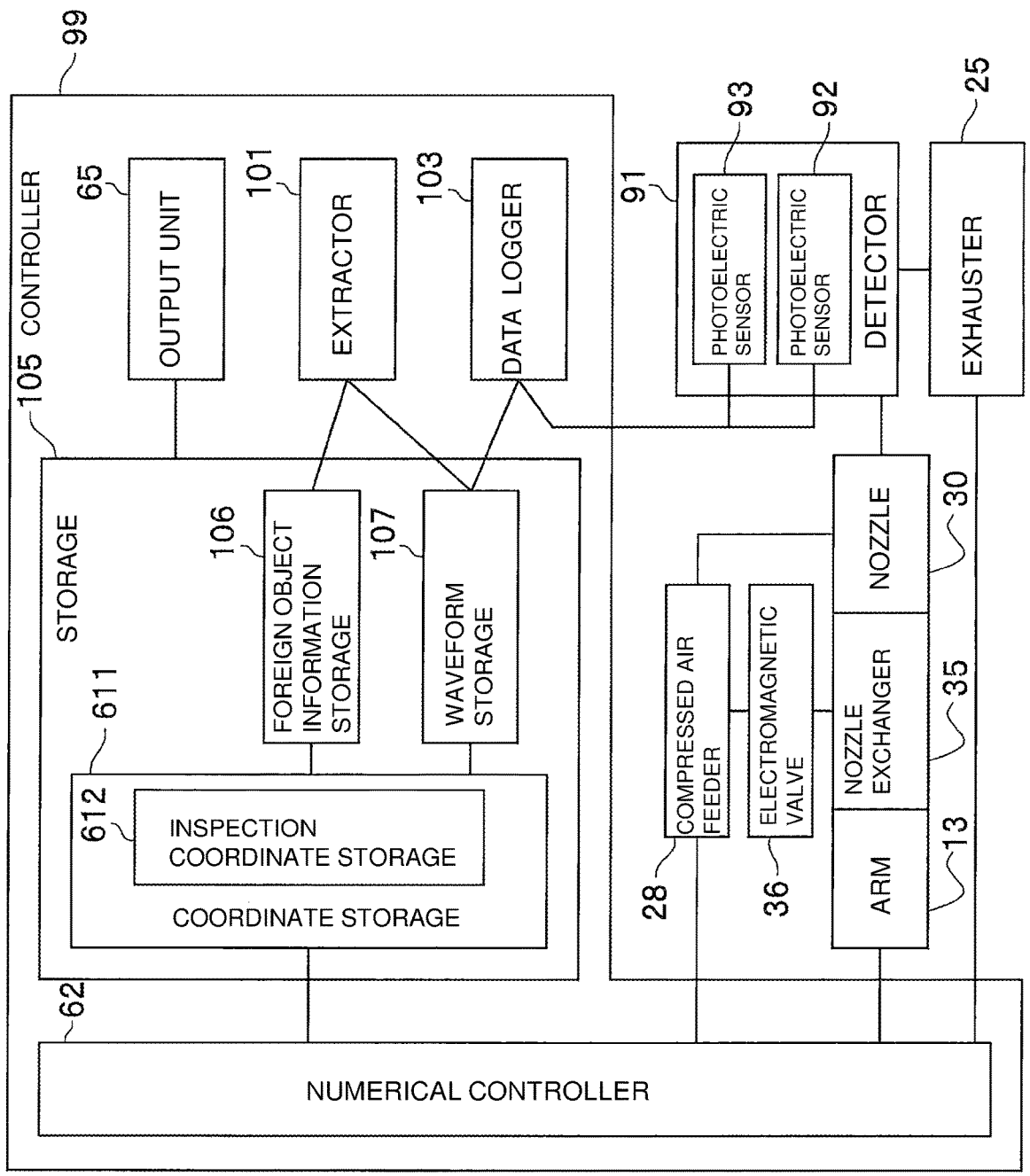
FIG. 16 is a block diagram of a foreign object inspection device according to the third embodiment.
Figure 17:
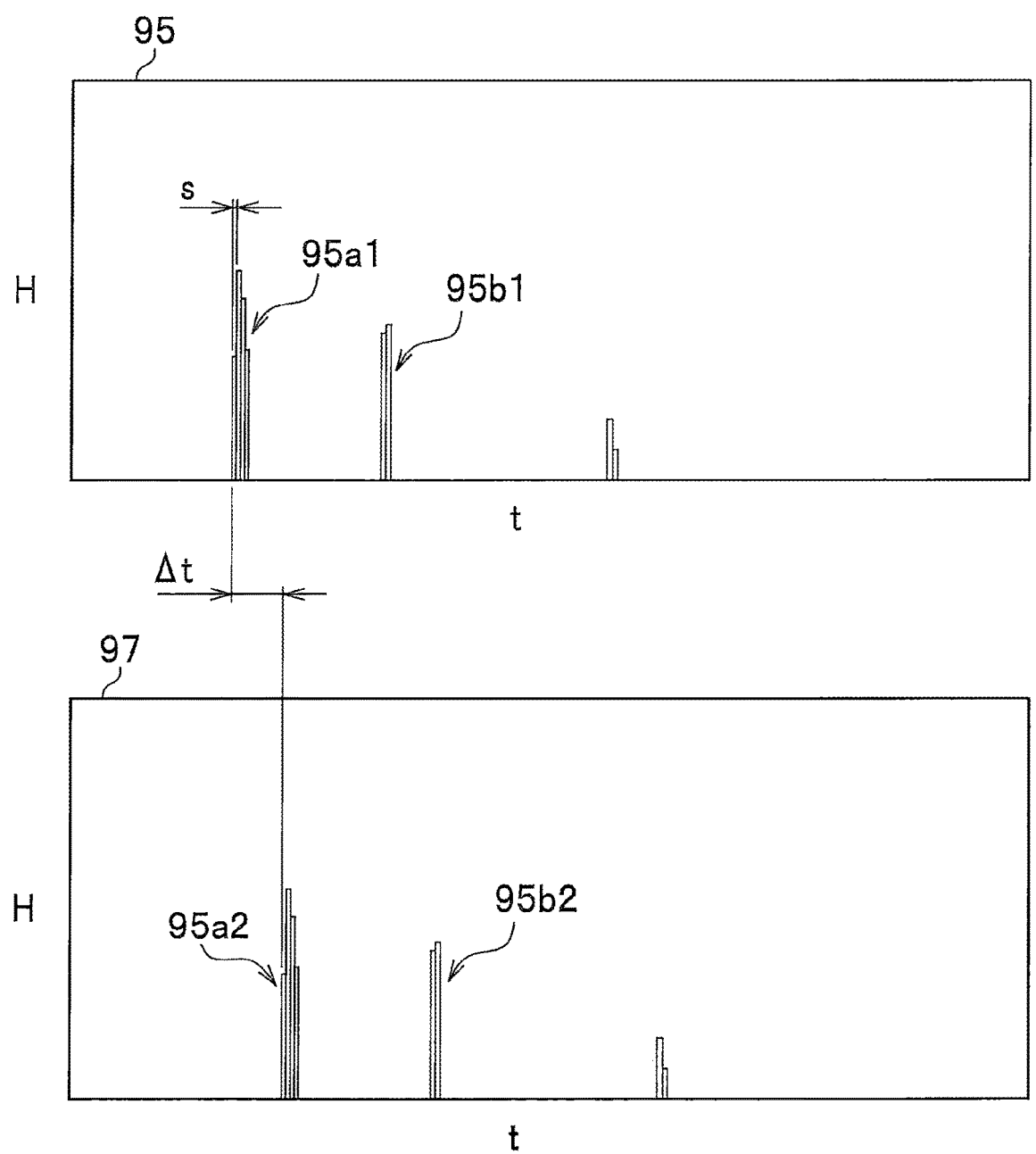
FIG. 17 is a graph showing detected waveforms according to the third embodiment.

An inspection device 90 according to a third embodiment will now be described with reference to FIGS. 15 to 17. The present embodiment differs from the first embodiment in the detector and the controller. The inspection device 90 includes a detector 91 and a controller 99. The other components of the inspection device 90 are the same as those of the inspection device 10.

The detector 91 will now be described with reference to FIG. 15. The detector 91 includes a transparent channel 74, and photoelectric sensors 92 and 93. The photoelectric sensor 92 includes a projector 921 and a light receiver 922. The photoelectric sensor 93 includes a projector 931 and a light receiver 932. The projector 921 emits a strip of projection light 94 spread across the width of the transparent channel 74. The projection light 94 is emitted perpendicularly to the direction of the flow of the transparent channel 74 (perpendicularly to the lateral direction in the figures). The projection light 94 is, for example, a laser beam or a pulse modulated light beam. The light receiver 922 receives the projection light 94 transmitted through the transparent channel 74. The light receiver 922 detects a blocked width H, by which the light is blocked by the foreign object 51 moving through the projection light 94. The light receiver 922 detects the blocked width H with a high frequency f. The frequency f is set to allow detection of the moving foreign object 51 multiple times. For example, the frequency f is 16 to 32 kHz. The photoelectric sensor 93 has the same structure and functions as the photoelectric sensor 92. The photoelectric sensors 92 and 93 are arranged parallel with an interval L between them.

The two photoelectric sensor sets may be replaced by a single photoelectric sensor set and a velocimeter that measures the velocity of the flow in the transparent channel 74. The velocimeter may be a laser Doppler velocimeter.

The controller 99 will now be described with reference to FIG. 16. The controller 99 includes a data logger 103, an extractor 101, and a storage 105. The storage 105 includes a foreign object information storage 106 and a waveform storage 107.

The data logger 103 obtains the blocked width H in the photoelectric sensors 92 and 93 at the frequency f. The obtained waveform is stored into the waveform storage 107.

The extractor 101 extracts the waveform of the foreign object 51 that has moved through the detector 91 from the waveforms stored in the waveform storage 107, and calculates the size of the foreign object 51. The calculated size and the waveform of the foreign object 51 are stored into the foreign object information storage 106.

The function of the extractor 101 will be described with reference to FIG. 17. FIG. 17 includes a graph 95 showing the amount of blocked light in the photoelectric sensor 92, and a graph 97 showing the amount of blocked light in the photoelectric sensor 93. The graphs 95 and 97 have the horizontal axes indicating the time t, and the vertical axes indicating the blocked width H. The time t is synchronized between the graphs 95 and 97. The graphs 95 and 97 show peaks 95$a$1 and 95$a$2, and peaks 95$b$1 and 95$b$2 of substantially the same shape. The extractor 101 matches the peaks 95$a$1 and 95$b$1 and other peaks in the graph 95 to the corresponding peaks 95$a$2 and 95$b$2 and other peaks in the graph 97. The extractor 101 detects matching peaks based on the peak width, the peak height, the peak shape, the order of the peaks, and the difference in detection time between the peaks. The extractor 101 pairs the matching peaks. The extractor 101 may eliminate the unmatching peaks. The difference in detection time between the peaks is a time difference between the paired peaks 95$a$1 and 95$a$2.

The following formula holds:

$$s1 = ns = n\frac{V}{f} = \frac{nL}{\Delta t f} \qquad \text{Formula 1}$$

$$A = \int sH = \int \frac{LH}{\Delta t f}$$

In the formula, $\Delta t$ indicates the difference in detection start between paired peaks, A indicates the area of the foreign object 51, s indicates the foreign object length in the flow direction to obtain one set of data, V indicates the speed at which the foreign object 51 moves, f indicates the frequency at which data is obtained, H indicates the blocked width for each data set, L indicates the interval between the photoelectric sensors 92 and 93, n indicates the number of data sets contained in each peak, and s1 indicates the length of the foreign object 51.

For a pair of extracted peaks with different sizes detected by the photoelectric sensors 92 and 93, the extractor 101 calculates the length s1 and the area A of a foreign object for the larger one of the two matching peaks.

The extractor 101 extracts, as a foreign object for one inspection spot 18, peaks 95a (95a1 or 95a2) and 95b (95b1 or 95b2) and other peaks detected before the moving time elapses from when the arm 13 moves the nozzle 30 to be in contact with the inspection spot 18 and inserts the lance 34. The foreign object information storage 106 stores the calculated foreign object information and the relevant peaks in a manner associated with the inspection spots 18.

The present invention is not limited to the above-described embodiments, and various modifications are possible without departing from the gist of the present invention, and all technical matters included in the technical concept described in the claims are encompassed by the present invention. While specific embodiments have been described, those skilled in the art may practice various alternatives, modifications, alterations, or improvements from the disclosure described herein, and all such variations fall within the scope of the invention defined by the appended claims.

REFERENCE SIGNS LIST 10, 70, 90 foreign object inspection device
13 arm
17 workpiece (inspection target)
18, 181, 182, 185 inspection spot
21 suction duct (suction channel)
25 exhauster
28 compressed air feeder
30 nozzle
32 suction nose
33 suction port
34 lance
40, 73, 91 detector
42 capture chamber
44 filter
45 support body (support)
51 foreign object
52 foreign object image
53 filter image
60, 80, 99 controller
61, 81, 105 storage
62 numerical controller
74 transparent channel
75 high-speed camera
92, 93 photoelectric sensor

What is claimed is:

1. A foreign object inspection device for inspecting foreign objects at inspection spots of a workpiece, the device comprising:
a nozzle including a suction port configured to suck a foreign object;
an exhauster;
a suction channel connecting the nozzle to the exhauster;
a detector installed on the suction channel, and configured to detect foreign object information about a shape of the foreign object sucked through the suction port; and
a controller including a storage configured to store the foreign object information in a manner associated with an inspection spot,
the detector including
a housing containing a cylindrical capture chamber,
a suction path connection port in a side surface of the capture chamber, the suction path connection port connecting to the suction channel,
a filter configured to capture a foreign object entering the capture chamber, and
an imaging device configured to form an image of the foreign object captured on the filter,
the storage including
a filter image storage configured to store a filter image for each inspection spot, and
a foreign object image storage configured to store a foreign object image, and
the controller including
an extractor configured to extract the foreign object image from the filter image, and
a matching unit configured to match a foreign object image extracted from a filter image for a target inspection spot to a foreign object image extracted from a filter image for an inspection spot preceding the target inspection spot, and determine an unmatching foreign object image as a foreign object image for the target inspection spot.

2. The foreign object inspection device according to claim 1, wherein
the foreign object information includes at least one selected from the group consisting of a length, an area, and an image of the foreign object.

3. The foreign object inspection device according to claim 1, further comprising:
an arm configured to move the nozzle relative to the workpiece.

4. The foreign object inspection device according to claim 3, further comprising:
a numerical controller configured to control the arm using coordinates of the suction port.

5. The foreign object inspection device according to claim 4, wherein
the storage stores the foreign object information in correspondence with the coordinates.

6. The foreign object inspection device according to claim 1, wherein
the storage stores an inspection spot number for the inspection spot and stores the foreign object information in correspondence with the inspection spot number.

7. The foreign object inspection device according to claim 1, wherein
the controller includes a timer configured to measure a moving time from when suction is started to when the foreign object is detected.

8. The foreign object inspection device according to claim 7, wherein
the storage stores the foreign object information detected from when the suction is started to when the moving time elapses in a manner associated with the inspection spot.

9. The foreign object inspection device according to claim 1, wherein the detector includes
a support supporting the filter, and configured to allow a gas to flow through the support, and
a window in the capture chamber.

10. The foreign object inspection device according to claim 1, wherein the nozzle includes
a suction pipe including the suction port at a distal end thereof, and
a suction nose located at the distal end of the suction pipe to hold the suction port in a manner retractable along an axis of the suction pipe.

11. The foreign object inspection device according to claim 10, further comprising:

a compressed air feeder, wherein the nozzle includes a lance having a distal end extending along the axis of the suction pipe inside the suction pipe, and the lance has an orifice.

12. The foreign object inspection device according to claim 2, further comprising:

an arm configured to move the nozzle relative to the workpiece.

13. The foreign object inspection device according to claim 12, further comprising:

a numerical controller configured to control the arm using coordinates of the suction port.

14. A method for inspecting a foreign object on a workpiece, comprising:

placing a suction port in contact with an inspection spot of a workpiece;

sucking a foreign object through the suction port;

detecting foreign object information about a shape of the foreign object;

storing the foreign object information in a manner associated with the inspection spot;

capturing the foreign object by a filter;

forming an image of the foreign object captured on the filter;

storing a filter image for each inspection spot;

extracting the foreign object image from the filter image;

matching a foreign object image extracted from the filter image for a target inspection spot to a foreign object image extracted from the filter image for an inspection spot preceding the target inspection spot; and determining an unmatching foreign object image as a foreign object image for the target inspection spot.

15. The foreign object inspection method according to claim 14, further comprising:

inserting a lance installed in the nozzle into the inspection spot; and jetting compressed air through an orifice of the lance to the inspection spot.

\* \* \* \* \*